United States Patent [19]

Sasano et al.

[11] Patent Number: 5,220,599
[45] Date of Patent: * Jun. 15, 1993

[54] COMMUNICATION TERMINAL APPARATUS AND ITS CONTROL METHOD WITH PARTY IDENTIFICATION AND NOTIFICATION FEATURES

[75] Inventors: Jun Sasano, Fuchu; Takahiro Endo, Kokubunji; Akihito Tsukamoto, Hino, all of Japan

[73] Assignee: Kabushiki Kaisha Toshiba, Kawasaki, Japan

[*] Notice: The portion of the term of this patent subsequent to Apr. 6, 2010 has been disclaimed.

[21] Appl. No.: 706,014

[22] Filed: May 28, 1991

Related U.S. Application Data

[62] Division of Ser. No. 388,560, Aug. 2, 1989.

[30] Foreign Application Priority Data

Aug. 12, 1988 [JP] Japan .................. 63-202459
Oct. 20, 1988 [JP] Japan .................. 63-264398

[51] Int. Cl.$^5$ .................. H04J 3/12; H04M 1/57; H04M 3/02
[52] U.S. Cl. .................. 379/142; 379/67; 379/88; 379/196; 379/245; 379/374; 379/375; 379/396; 370/110.1
[58] Field of Search .................. 379/245, 247, 198, 197, 379/196, 142, 199, 67, 88, 375, 374, 217, 376, 373, 396; 370/110.1

[56] References Cited

U.S. PATENT DOCUMENTS

| 4,006,316 | 2/1977 | Bolgiano | 379/199 X |
|---|---|---|---|
| 4,266,098 | 5/1981 | Novak | 379/77 |
| 4,477,697 | 10/1984 | Judd et al. | 379/375 |
| 4,549,045 | 10/1985 | Castro et al. | 379/199 X |
| 4,578,540 | 3/1986 | Borg et al. | 379/199 X |
| 4,639,552 | 1/1987 | Hall | 379/199 |
| 4,674,115 | 6/1987 | Kaleita et al. | 379/201 |
| 4,720,848 | 1/1988 | Akiyama | 379/88 |
| 4,723,273 | 2/1988 | Diesel et al. | 379/211 |
| 4,742,516 | 5/1988 | Yamaguchi | 370/94 |
| 4,755,985 | 7/1988 | Jayapalau et al. | 370/58 |
| 4,797,913 | 1/1989 | Kaplan et al. | 379/91 |
| 4,850,012 | 7/1989 | Mehta et al. | 379/157 |
| 4,856,055 | 8/1989 | Schwartz | 379/374 |
| 4,893,335 | 1/1990 | Fuller et al. | 379/200 |
| 4,894,861 | 1/1990 | Fujioka | 379/374 |
| 4,939,777 | 7/1990 | Oka | 379/387 |
| 4,942,598 | 7/1990 | Davis | 379/57 |
| 5,056,083 | 10/1991 | Sasano | 370/110.1 |
| 5,103,449 | 4/1992 | Jolissaint | 370/110.1 |

FOREIGN PATENT DOCUMENTS 0065949 4/1982 Japan .................. 379/217
0182356 8/1986 Japan .................. 379/199

Primary Examiner—Thomas W. Brown
Attorney, Agent, or Firm—Finnegan, Henderson, Farabow, Garrett & Dunner

[57] ABSTRACT

A communication terminal apparatus connected to an integrated services digital network to transmit data from an outgoing call office to an incoming call office and a method of controlling the communication terminal apparatus, in which notification of a person to be called for an incoming signal and acceptance or rejection of the incoming signal are controlled on the basis of predetermined identification data contained in the incoming signal. When detecting the identification data contained in the incoming signal, the present apparatus compares the detected identification data with registration identification data previously registered so that, if the apparatus finds a coincidence therebetween, it informs the user of corresponding to the coincided identification data visually by character data or audibly by a sound. If the apparatus fails to find a coincidence therebetween then it rejects the acception of the incoming signal containing this identification data, while if it finds a coincidence then it grants the acception of the incoming signal containing the coincided identification data.

12 Claims, 26 Drawing Sheets

| NO. | SET FLAG | CALLED PARTY | SUBADDRESS | RINGING SIGNAL TONE |
|---|---|---|---|---|
| 0 | 0 |  | NONE | C |
| 1 | 1 | Mr.A | 1AH | A |
| 2 | 1 | Mr.B | 1BH | B |
| 3 | 1 | Mr.C | 1CH | C |
| 4 | 0 | Mr.D | NONE | C |
| 5 | 0 | Mr.E | NONE | C |

IN ABSENCE OF SUBADDRESS

IN PRESENCE OF SUBADDRESS

| No | CALLER TELEPHONE NUMBER | | | CALLED-PARTY SUBADDRESS |
|----|------|-----|------|------|
| 1 | 03 | 111 | 2222 | 01 |
| 2 | 045 | 222 | 3333 | 02 |
| 3 | 03 | 333 | 4444 | 01 |
| 4 | 03 | 555 | 6666 | 01 |
| 5 | 045 | 444 | 5555 | 02 |
| 6 | 045 | 666 | 7777 | 02 |
| 7 | 06 | 123 | 4567 | φφ |
| 8 | 06 | 345 | 9876 | φφ |
| 9 | 0425 | 543 | 8777 | NONE |

| LED NO. | SET FLAG | SUB-ADDRESS |
|---|---|---|
| 0 | 1 | 00H |
| 1 | 0 | |
| 2 | 0 | |
| 3 | 7 | 37H |
| 4 | 1 | 25H |
| 5 | 0 | |
| 6 | 0 | |
| 7 | 1 | 22H |
| 8 | 1 | NONE |

← OWN SUB-ADDRESS

COMMUNICATION TERMINAL APPARATUS AND ITS CONTROL METHOD WITH PARTY IDENTIFICATION AND NOTIFICATION FEATURES

This is a division of application Ser. No. 07/388,560, filed Aug. 2, 1989.

BACKGROUND OF THE INVENTION

1. Field of the Invention

The present invention relates to communication terminals which are connected to a digital network to transmit data from an outgoing call office to an incoming call office, for example, communication terminals which can be connected to an integrated services digital network (hereinafter referred to as ISDN) and control methods thereof. More particularly, the present invention relates to a communication terminal apparatus and its control method which allow the control of notification of an incoming signal to a party to be called and the control of acceptance or rejection of the incoming signal in accordance with predetermined identification data contained in the incoming signal.

2. Description of the Related Art

As communication techniques advance and communication forms diversify various network systems have been developed, one of which is the ISDN.

The ISDN is a digital network which integrally handles various communication processing services such as the transmission of telephone data, information, and facsimile communication data. A communication system using the ISDN has an ISDN exchange which is connected at one side with a digital line switching network, a packet switching network, a common channel signalling network or so on, and which is also connected at the other side with communication terminals installed in homes, such as telephone sets, facsimile machines, voice mail machines and so on, through a subscriber in-home bus having a pair of digital communication network subscriber lines of T (transmission or up) and R (reception or down) lines. In the ISDN-based communication system, a plurality of communication channels are processed on a time-division multiplex basis for each subscriber line and selectively used to realize desired communication between communication terminals. For example, when a fundamental interface has a transmission rate of 192 kbits/sec, two B channels of 64 kbits/sec and one D channel of 16 kbits/sec are multiplexed on a time division basis to perform transmission of data or the like.

In this type of system, the in-home bus connects the communication terminals and an in-home network terminating unit connected to each subscriber line. With the fundamental interface, up to 8 communication terminal apparatuses can be connected to the in-home bus. The user can arbitrarily set a subaddress as terminal identification data at each of these communication terminals. When an incoming signal appears on the in-home bus, each communication terminal searches a subaddress from a call setting message sent from the caller side (ISDN exchange side). If the terminal detects a subaddress, then it collates the detected subaddress with the subaddress of the terminal. Upon a coincidence between both subaddresses, the terminal apparatus performs an operation for the incoming signal. Accordingly, when the caller transmits such a call control message that has not only a called number corresponding to a subscriber line, but also a desired subaddress inserted therein, communication with a desired one of a plurality of communication terminals connected to a single subscriber line can be realized. In this system, if the terminal fails to find a subaddress in an incoming signal, then all the terminals can answer to the incoming signal.

In this case, an interconnection of the originating terminal to another in-home bus through another network terminating unit is established by the ISDN exchange located at a central station.

More specifically, when it is desired to communicate through the ISDN, a calling terminal sends a call setting message, including the telephone number of an in-home bus, through the 16-kbps control signal channel (D channel) and its network terminating unit to the network. On the call receiving side, a plurality of receiver terminals connected to the receiver in-home bus receive the call setting message transmitted from the network to a receiver 16 kbps control signal channel through a receiver network terminating unit and perform ringing operations. When it is desired that the calling terminal selectively call a desired one of the plurality of receiver terminals connected to the receiver in-home bus, the calling terminal sends to the network a call setting message that contains a receiver in-home bus telephone-number element followed by a subaddress, such as a receiver-terminal identification data element. The receiver terminals then check the receiver-terminal identification data element in the call setting message received from the network. If one of the receiver terminals finds its own terminal identification data, then it sends a ringing element back to the network and starts its ringing data operation.

In the above case, it has been possible for the call sender to identify or select a desired one of the call receiver terminals, but it has been impossible that the sender selects an individual person be called at each of the call receiver terminals.

For this reason, it has been common practice that any one of the users commonly using the terminal must once answer the incoming call, talk with the party, ask the desired speaker and finally call him or her to answer it.

In particular, when a single communication terminal is commonly used by a plurality of persons, it would be convenient that an incoming signal could be selectively directed to a particular individual person. Such a prior art communication terminal apparatus as mentioned above, however, has a problem in that identification of the communication terminal is carried out on the basis of its single subaddress, and thus the terminal cannot identify the desired one of a plurality of common users for the terminal apparatus.

In addition, with communication terminals connected to the in-home bus of the digital communication network mentioned above, each of the terminals is provided with a display (for example, an LCD (liquid crystal display)) on which, upon reception of an incoming signal, its caller identification data (for example, telephone number) is indicated. Such a communication terminal apparatus is also known that the apparatus stores caller identification data and each time it receives an incoming signal, it outputs the stored identification data for user's for the user's reference. This terminal apparatus is advantageous in that even when the target user leaves her or his desk, one of the other users can know the telephone number of the calling party.

However, in companies and business offices an inconvenience occurs when a single communication terminal apparatus is commonly used by a plurality of persons, even when the apparatus outputs the identification data of a caller on an incoming signal, because it took much time for every user to look at their own communication terminal.

In addition, the above system is inconvenient because the system is arranged to ring only at terminal having a subaddress coincided with that of an incoming signal. Therefore, the call receiver cannot know that he is being called unless the call receiver troublesomely goes to the ringing terminal.

SUMMARY OF THE INVENTION

In view of such circumstances, it is an object of the present invention to provide a communication terminal commonly used by a plurality of persons which can reliably identify to which one of the plurality of persons an incoming signal is directed, and also to provide a method of controlling the terminal apparatus.

Another object of the present invention is to provide a communication terminal and its control method which, when a caller desires to talk with a specific one of the common users of a communication terminal, can inform the specific user that the incoming signal is directed to the specific user in a suitable manner.

A further object of the present invention is to provide a communication terminal commonly used by a plurality of persons which can quickly determine the caller's identification data in an incoming signal.

Yet another object of the present invention is to provide a communication terminal system in which a plurality of communication terminals are connected to a single in-home bus and users can easily know at which one of the terminals an incoming signal arrived.

Yet a further object of the present invention is to provide a line terminal apparatus and its control method which can selectively respond to only a desired party or parties.

Another object of the present invention is to provide a communication terminal apparatus which can specify that an incoming signal activate an automatic answering unit, whereby a voice recording medium in the automatic answering unit can be reduced in necessary medium capacity.

In accordance with the present invention, the above objects can be attained by providing a communication terminal apparatus which comprises a display part for displaying data corresponding to the identification data of an incoming signal on a communication terminal apparatus connected to a line, a registration part for previously registering therein a plurality of identification data, and a display control part for checking whether or not the identification data of the incoming signal received through the line coincides with one of the plurality of identification data previously registered in the registration part, and when finding a coincidence therebetween, for causing the identification data to be displayed on the display part.

With such an arrangement as mentioned above, since a plurality of identification data can be registered, the registered identification data can be associated with a plurality of common users for the communication terminal apparatus. When the identification data of an incoming signal coincides with one of the registered identification data, data corresponding to the identification data is displayed on the terminal apparatus, whereby corresponding one of the users can know his own incoming signal.

In accordance with another aspect of the present invention, there is provided a communication terminal apparatus connected to an integrated services digital network to transmit data from an outgoing call office to an incoming call office, which apparatus comprises a detection part for detecting identification data contained in an incoming signal, a registration part for registering therein a plurality of identification data, a comparison part for comparing the identification data detected by the detection part with the identification data previously registered in the registration part, and a notification part, when the comparison part finds coincidence between the detected identification data and the registered identification data, for informing a user of information corresponding to the identification data.

In accordance with a further aspect of the present invention, there is provided a communication terminal apparatus which comprises an incoming data registration part, when receiving caller identification data and called-individual identification data, for registering therein the caller identification data and the called-individual identification data in associated relationship with each other, an input part through which data are entered, a display part for displaying data thereon, and a called individual identification data collation part, when receiving from the input part a display request regarding caller identification data associated with a predetermined called-individual identification data, for retrieving the incoming-signal data registration part, extracting the caller identification data previously stored as associated with the predetermined called-individual identification data in the incoming signal data registration part, and sending it to the display part for its display.

When the communication terminal apparatus of the above arrangement comprises a telephone set and the called-individual identification data and caller identification data are stored associated with each other, one of the stored caller identification data associated with predetermined called-individual identification data is displayed. That is, the caller identification data relating to the incoming signal directed to a particular individual is output, thus eliminating the need for the troublesome operation of looking at the terminal by the particular individual's searching through the stored data by looking at his terminal.

In accordance with yet another aspect of the present invention, provided is a communication terminal apparatus which comprises a registration part for registering therein the subaddresses of terminal apparatuses connected to an identical in-home bus and notification parts of the terminal apparatuses to be called associated with each other, and a control part for collating the subaddress of the incoming signal with the subaddresses previously registered in the registration part, and when finding a coincidence therebetween, for controlling one of the notification parts to inform the terminal(s) corresponding to the subaddress that the incoming signal is directed to that terminal.

In such an arrangement, the terminals are previously registered by their subaddresses associated therewith. When the system receives an incoming signal and the control part detects a subaddress in the data of the incoming signal, the control part compares the detected subaddress with the registered subaddresses. The control part, when finding a coincidence therebetween, issues an order to tell the users the reception of the incoming signal directed to one of the terminal apparatuses corresponding to the coincided subaddress, for example, an order to drive the associated display element informing the associated user of the presence of his incoming signal.

Therefore, the associated user can easily know by viewing the display that the incoming signal is directed to him among the users of the plurality of terminal apparatuses.

According to yet another aspect of the present invention, there is provided a communication terminal apparatus which comprises a memory part for storing therein a plurality of subscriber numbers, a detection part for detecting a call-originator subscriber number contained in an incoming signal, and a incoming-signal answering control part for collating the detected call-originator subscriber number with the subscriber numbers already registered in the memory part, and, only when finding a coincidence therebetween, for granting the acceptance of the incoming signal.

With this arrangement, when the subscriber number is the same as the call-originator subscriber number contained in the incoming signal is stored in the memory part, the control part grants the acceptance of the incoming signal. When the same subscriber number is not stored, the control part rejects the acceptance of the incoming signal.

As a result, as so long as the subscriber numbers which are included in respective incoming signals, are previously stored in the memory part, the communication terminal system can only accept the incoming signals issued only from callers having subscriber numbers the same as the stored ones, thereby realizing communication only between the caller and the desired call receiver.

In the present invention, when receiving an incoming signal, the call receiving terminal takes in an incoming subaddress, an outgoing address and an outgoing subaddress in a call setting message sent from a caller side. When the terminal apparatus collates the incoming subaddress, outgoing address and outgoing subaddress with those previously registered therein and finds a coincidence therebetween, the apparatus determines that the terminal apparatus must start its automatic answering function. That is, in response to the incoming signal, the automatic answering unit of the associated terminal apparatus starts and sends its message to the caller, and thereafter records a message from the caller.

This arrangement enables the restrictive determination of incoming signals for which the automatic answering unit is started, thus minimizing the capacity necessary for recording caller messages.

DESCRIPTION OF THE PREFERRED EMBODIMENTS

Embodiments of the present invention will be described by referring to accompanying drawings.

Figure 2:
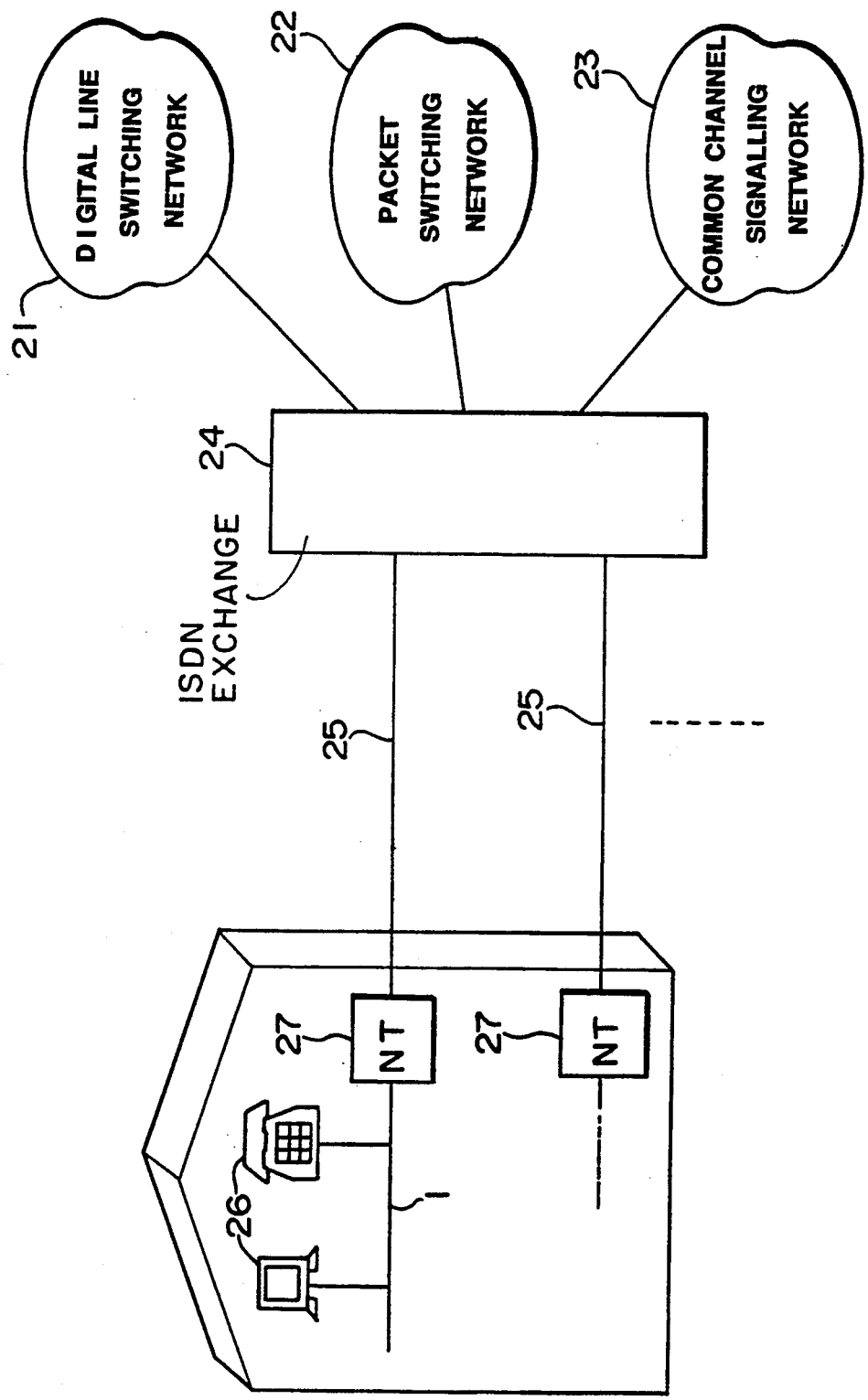
FIG. 2 is a block diagram showing a communication network system including an embodiment of the present invention.

Referring first to FIG. 2, there is shown a communication network system which includes an embodiment in accordance with the present invention. In the system, an ISDN exchange 24 is connected at its one side with a digital line switching network 21, a packet switching network 22 and a common channel signalling network 23, while the exchange 24 is connected at the other side through a subscriber line 25 with communication terminals 26 installed in a user's home and including a telephone set, a facsimile machine, a voice mail apparatus and the like. A plurality of communication channels are provided for each subscriber line 25 to be multiplexed on a time division basis so that these communication channels can be selectively used to realize desired communication between the communication terminals. For example, when a fundamental interface has a transmission rate of 192 kbits/sec, two B channels of 64 bits/sec and a D channel of 16 kbits/sec (kbps) are multiplexed on a time division basis to carry out transmission of data or the like.

Up to 8 of the communication terminals 26 can be connected to the each subscriber line 25 through an in-home bus 1 and an in-home line terminating unit 27.

Figure 1:
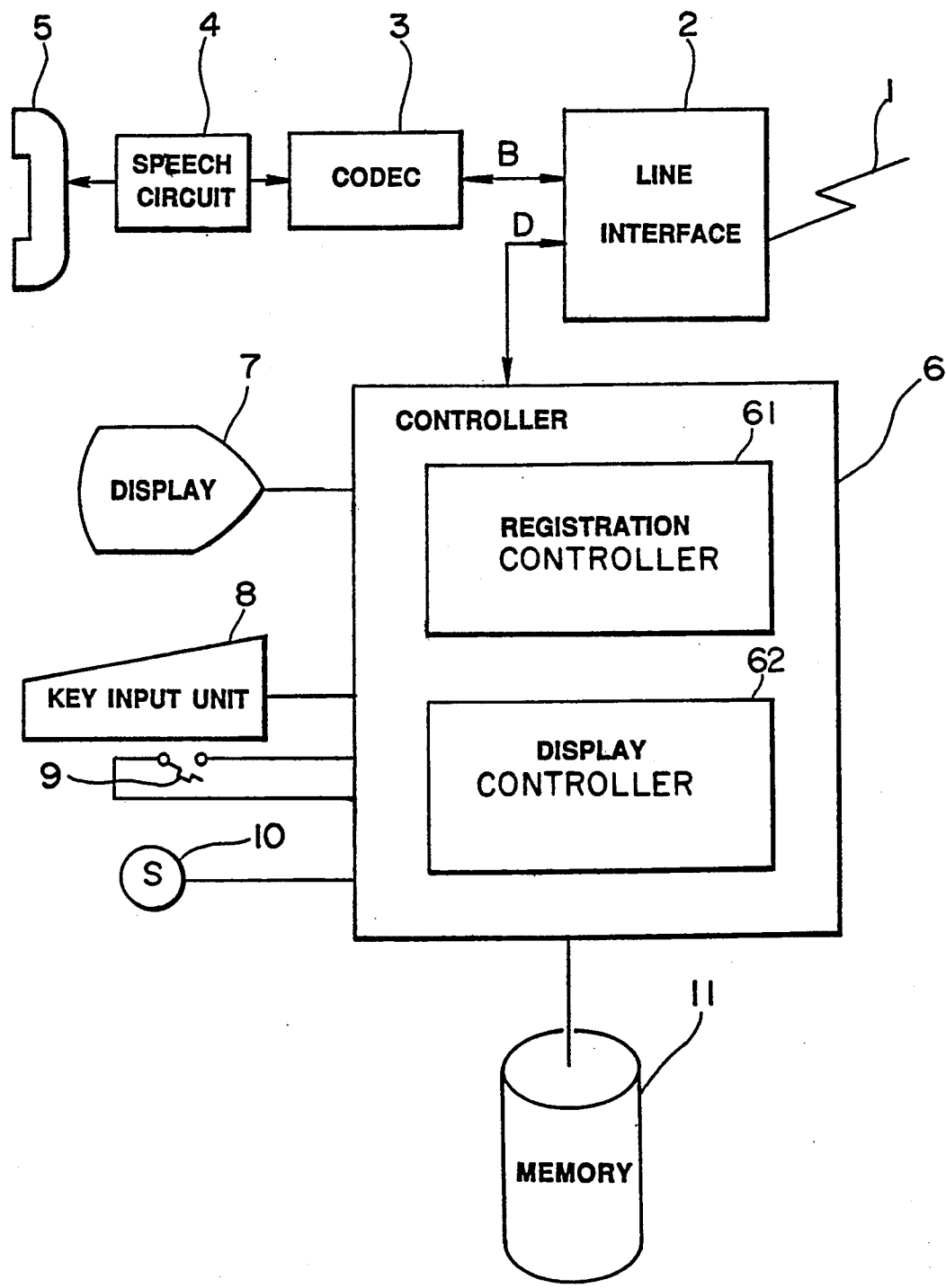
FIG. 1 is a block diagram of an embodiment of the present invention.
Figure 3:
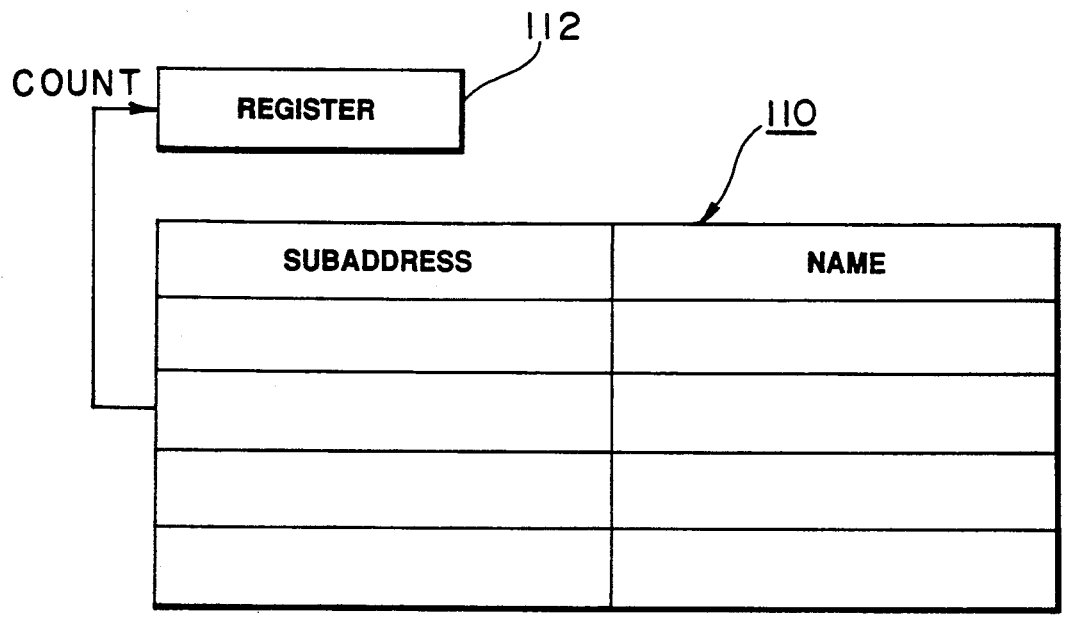
FIGS. 3 and 4 show the memory maps of memory tables which an embodiment of the present invention have, respectively.
Figure 4:
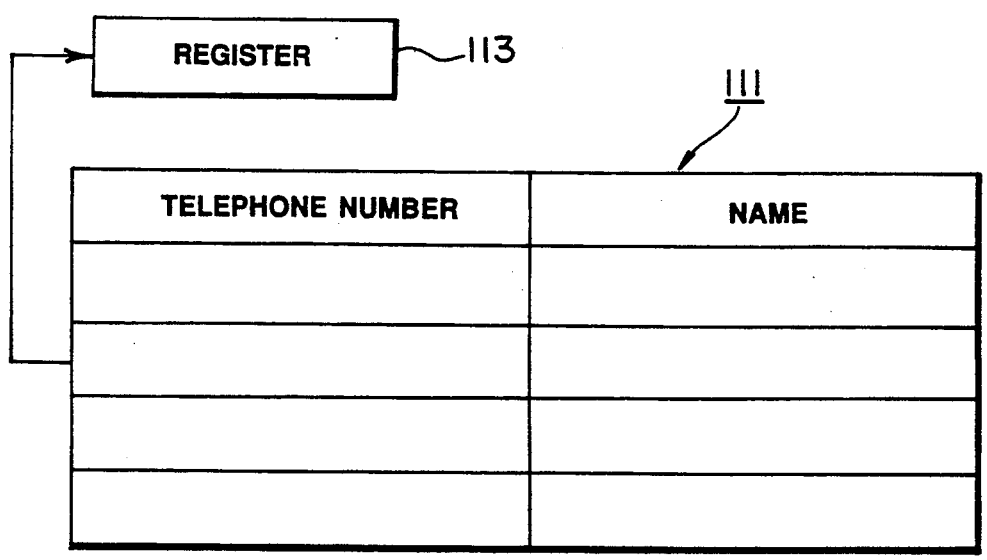
Figure 5:
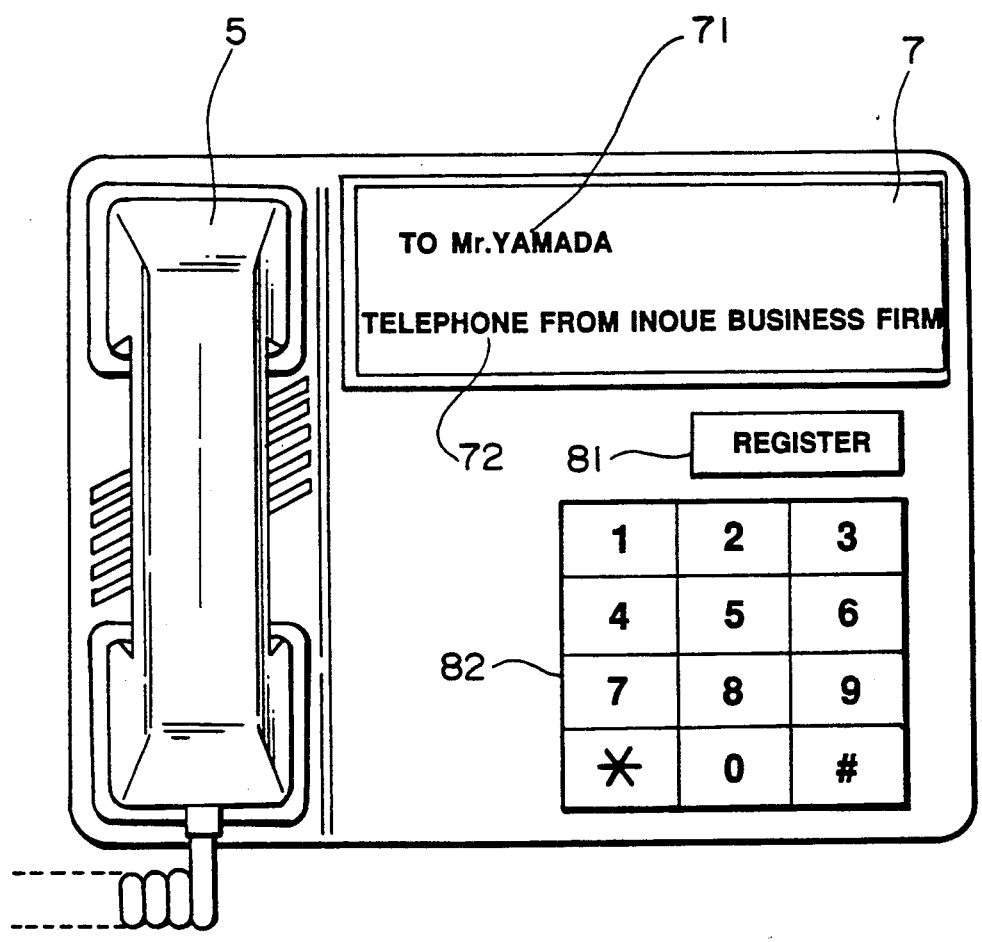
FIG. 5 is a plan view of an embodiment of the present invention.

Shown in FIG. 1 is a communication terminal apparatus which is embodied, as an example, as a telephone set. In the drawing, the in-home bus 1 as a digital subscriber line is connected to a line interface 2 which demultiplexes signals on the B and D channels. The in-home bus 1 comprises 2 B channels of 64 kbps to be used mainly as voice speech lines and a single D channel of 16 kbps to be used mainly for the transmission of a network control signal and data communication, the B and D channels being capable of being multiplexed on a time division basis. The line interface 2 acts to couple a predetermined group of time slots on the B channels with a codec 3 and also couple the D channel with a controller 5. The codec 3 is connected via a speech circuit 4 to a telephone 5, whereas the controller 6 is connected to a display 7 such as an LCD or an EL display, a key operating unit 8 including ten keys, a hook switch 9 for the handset 5, a sounder 10 for generating a ringing tone, and a memory 11 in which such various data as subaddresses are registered. The controller 6 itself comprises, in actual applications, a microcomputer which includes a microprocessor having a calculation control function, a main memory having a running program stored therein, a character generator and an I/O port for interconnection with the various parts. The controller 6 also includes a registration control unit 61 and a display control unit 62 which are realized when the microprocessor is executed under control of the program stored in the main memory. The registration control unit 61 performs data registration to a self subaddress memory table 110, such as shown in FIG. 3, and to an electronic telephone notebook memory table 111, such as shown in FIG. 4, both tables 110 and 111 being stored in the memory 11. Assume that the telephone set as a communication terminal apparatus has such a top view as shown in FIG. 5. The user operates a registration key of the key unit 8 to put the apparatus in its registration mode and then pushes the ten keys 82 of the key unit 8 in various combinations based on a predetermined procedure for entering and registering a subaddress and a name, and a telephone number and a name. During the above entering operation, relationships between the subaddress and name and between the telephone number and name are indicated on the display 7 based on the entered data.

After completing the registration to the self subaddress memory table 110 and the electronic telephone notebook table 111, the operator again operates the registration key 81 to end the registration mode. The number of self subaddresses registered and the number of telephone numbers registered are stored in registers 112 and 113 of the tables 110 and 111, respectively.

Figure 6:
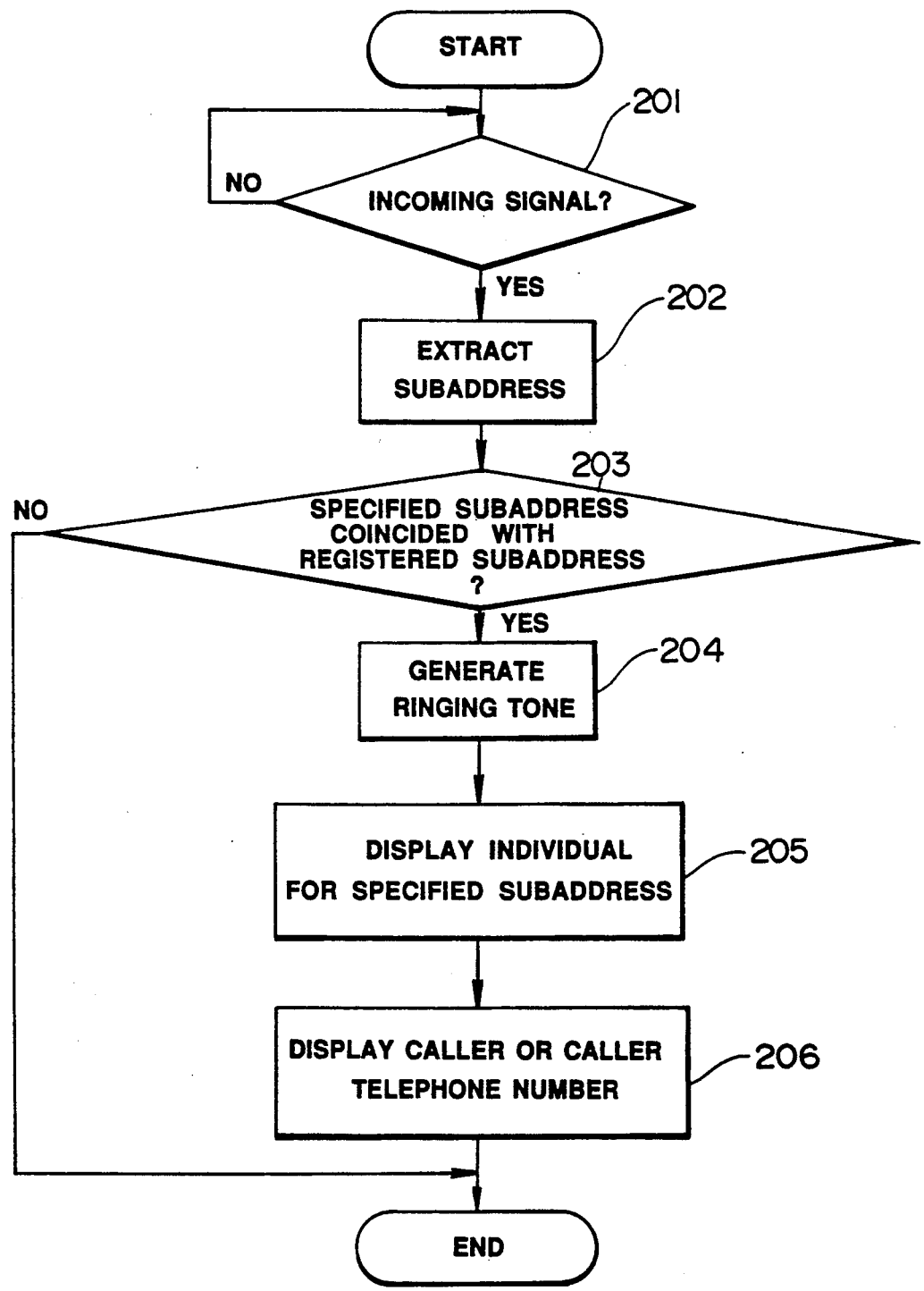
FIG. 6 is a flowchart for explaining the operation of an embodiment of the present invention.

The controller 6 will be operated as a display controller in accordance with the program of the flowchart of FIG. 6 stored in the main memory, as follows. The controller 6 first starts its operation to enter a signal on the D channel from the in-home bus 1 through the line interface 2 by checking whether or not the entered signal contains calling data to detect the presence of an incoming signal (step 201). In the case of the presence of an incoming signal, the controller 6 extracts a subaddress from the D channel signal (step 202), and sequentially compares the signal with the subaddresses of the self subaddress memory table 110 stored in the memory 11 to detect its coincidence or non-coincidence therebetween (step 203). If the controller 6 finds a coincidence, then it drives the sounder 10 to generate an incoming signal notifying tone (step 204), finds a corresponding name data from the self subaddress memory table 110 on the basis of the extracted subaddress, generates at the character generator a bit pattern corresponding to the individual name data, and then sends the bit pattern to the display 7 to be displayed thereon (step 205). Further, since the signal received from the D channel contains telephone number data of the signal sender, the controller 6 extracts the sender telephone number from the D channel signal, searches the electronic telephone notebook memory table 111, finds a corresponding name data on the basis of the extracted sender telephone number if registered, and generates a pattern of the signal sender corresponding to the name data. If the corresponding name data is not registered previously, then the controller 6 generates a pattern of the corresponding telephone number and sends it to the display 7 to be displayed thereon (step 206). More specifically, since a pattern informing the user of the presence of an incoming call is also generated simultaneously with the generation of the individual name pattern and the signal sender pattern, the call informing pattern is placed in a buffer register of the display 7. Then, these patterns are sequentially sent to the display 7 in a predetermined order. As a result, a message including an individual name 71 and a signal sender 72 is indicated on the display 7 of the telephone set as shown in FIG. 5, whereby corresponding one of a plurality of users commonly using the telephone set can identify the message as its own one.

Although the display 7 has been used as a visual display in the present embodiment, it may be embodied as a loudspeaker which can generate one of a plurality of melodies allocated to the registered subaddresses at the time of reception of an incoming signal. Of course, both the melody display and the visual display of the present embodiment may be employed. Further, persons or names to which subaddresses are allocated may be replaced with departments or sections, as a matter of course.

Figure 7:
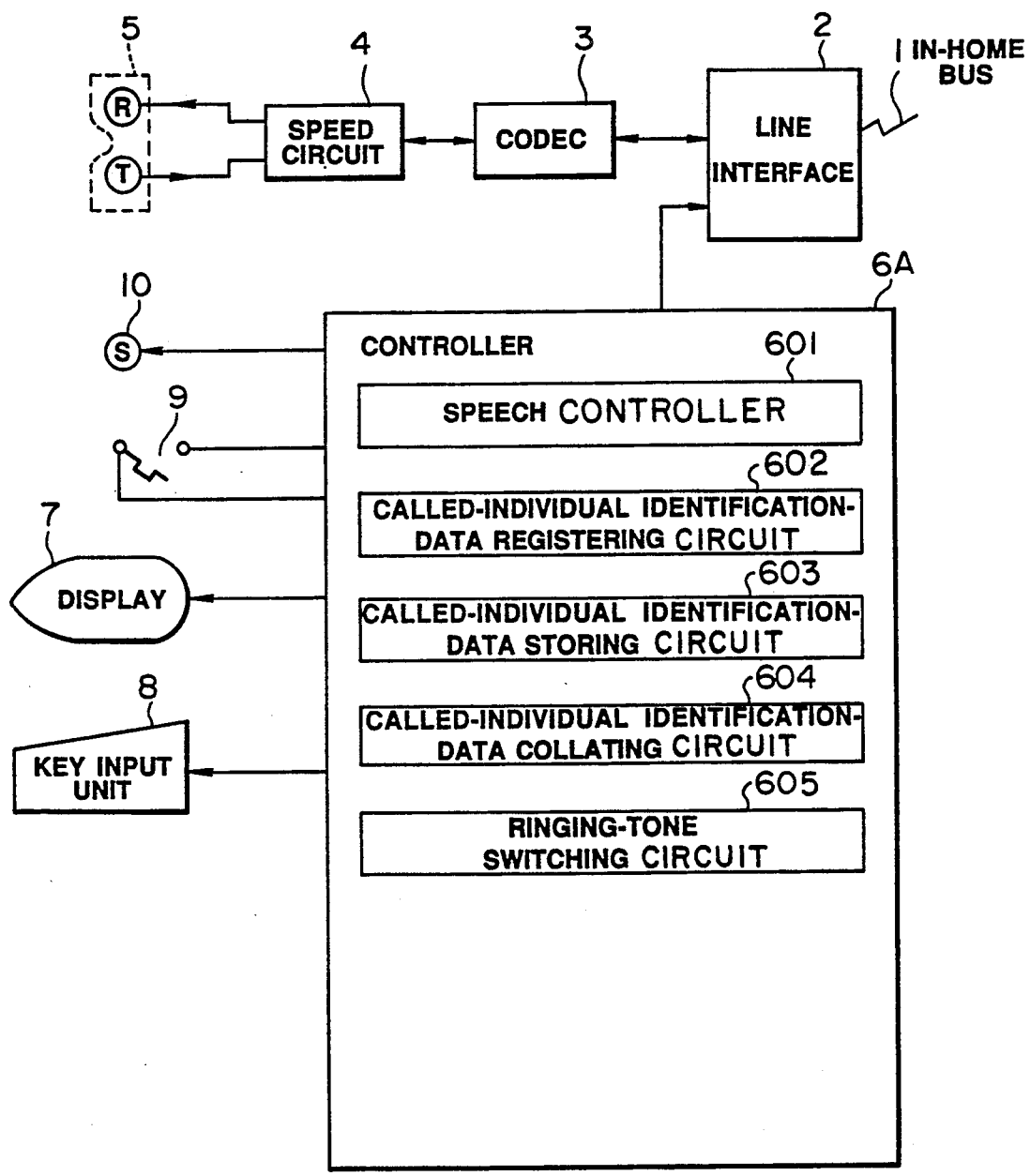
FIG. 7 is a block diagram showing another embodiment of the present invention.

FIG. 7 shows a block diagram of an arrangement of a telephone set in accordance with another embodiment of the present invention, in which parts having substantially the same functions as those in FIG. 1 are denoted by the same reference numerals and explanation thereof is omitted. In the drawing, a controller 6A, which forms a core to controller the entire apparatus, includes a speech control 601, a circuit 602 for registering called-individual identification data, a circuit 603 for storing the called-individual identification data, a circuit 604 for collating the called-individual identification data, and a ringing-tone switching circuit 605. In detail, the speech controller 601, when finding a coincidence with respect to the subaddress of an incoming call received in the call reception mode through subaddress collation, or when failing to find any subaddress in the incoming signal data, functions to drive the sounder 10, terminate the speech based on the detection of the hook switch 9, or perform calling and communication control.

The called-individual identification-data registering circuit 602, when the user pushes the registration key 81 to put the apparatus in the registration mode and enters called-individual identification data through the key unit 8, stores the entered data in an individual identification data area of the called-individual identification-data storing circuit 602. When the user enters through the key unit 8 the tone data of a ringing signal to be used to call the called individual, the called-individual identification-data registering circuit 602 also functions to store the entered tone data to a tone data area of the called-individual identification-data registering circuit 602.

The called-individual identification-data storing circuit 603, which has the individual identification data area and the tone data area, stores the called-individual identification tone data of the ringing signal registered through the called-individual identification-data registering circuit 602 in a corresponding relationship.

The called-individual identification-data collating circuit 604 functions to collate the received individual identification data with the individual identification data already stored in the called-individual identification-data storing circuit 603, and when finding a coincidence therebetween, to give an instruction to the ringing-tone switching circuit 605 to switch the ringing tone of the sounder 10 to the one of the registered tones designated to the called individual.

Explanation will next be made as to the operation of the apparatus having such an arrangement as mentioned above. Explanation will be made herein as to a telephone set, as an example of the apparatus, which specifies a terminal on the basis of a called-individual identification number and an incoming address, that is, a telephone number corresponding to the reception party and an incoming subaddress transmitted subsequent thereto.

Figures 8, 9:
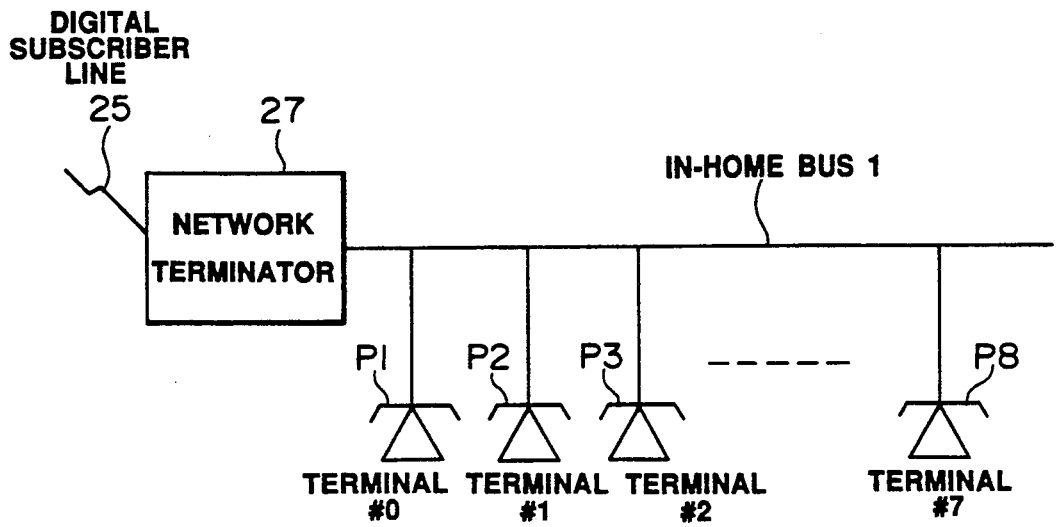
FIG. 8 shows an example of standard wiring of a digital subscriber line in a user's home.
FIG. 9 shows an example of registration of individual identification data.

Assume, for example, that 8 telephone sets P1 to P8 as terminals #0 to #7 are connected to the in-home bus 35 leading to a single digital subscriber line as shown in FIG. 8.

Also assume that such ringing tones as shown in FIG. 9 are already entered and set for the telephone sets P1 to P8 of the terminals #0 to #7 through the operation of the key unit 8.

Shown in FIG. 9 a memory format is stored in the called-individual identification-data storing circuit 603. In the format, a called individual A corresponding to set number 1, for example, has a subaddress "1AH" (where H denotes a hexadecimal notation representation), a ringing tone "A" and a set flag "1" meaning that the flag is set at "1". Under such conditions, if the apparatus receives an incoming subaddress "1AH" in the call reception mode, it generates a ringing signal of the tone "A". In the case where the set number is 0, when the apparatus receives a signal without any incoming subaddress attached (without any subaddress), it generates a ringing signal of tone "C", that is, the reception of an incoming signal without any incoming subaddress causes the generation of the ringing signal of tone "C". Likewise, in the case where the set number is 2, when the apparatus receives a call of subaddress "1BH" for a called individual B, it generates a ringing signal of tone "B"; and when the apparatus receives a call of subaddress "1CH" for a called individual C, it generates a ringing signal of tone "C". In the case of individuals D and E, the reception of an incoming call without subaddress causes the generation of a ringing signal of the tone "C".

The tone "C" is used for ordinary use and the tones "A" and "B" are for different specific uses. With respect to the tones "A" and "B", it can be specified with use of their set flags whether or not the ringing signals of the tones "A" and "B" are executed.

Figure 10:
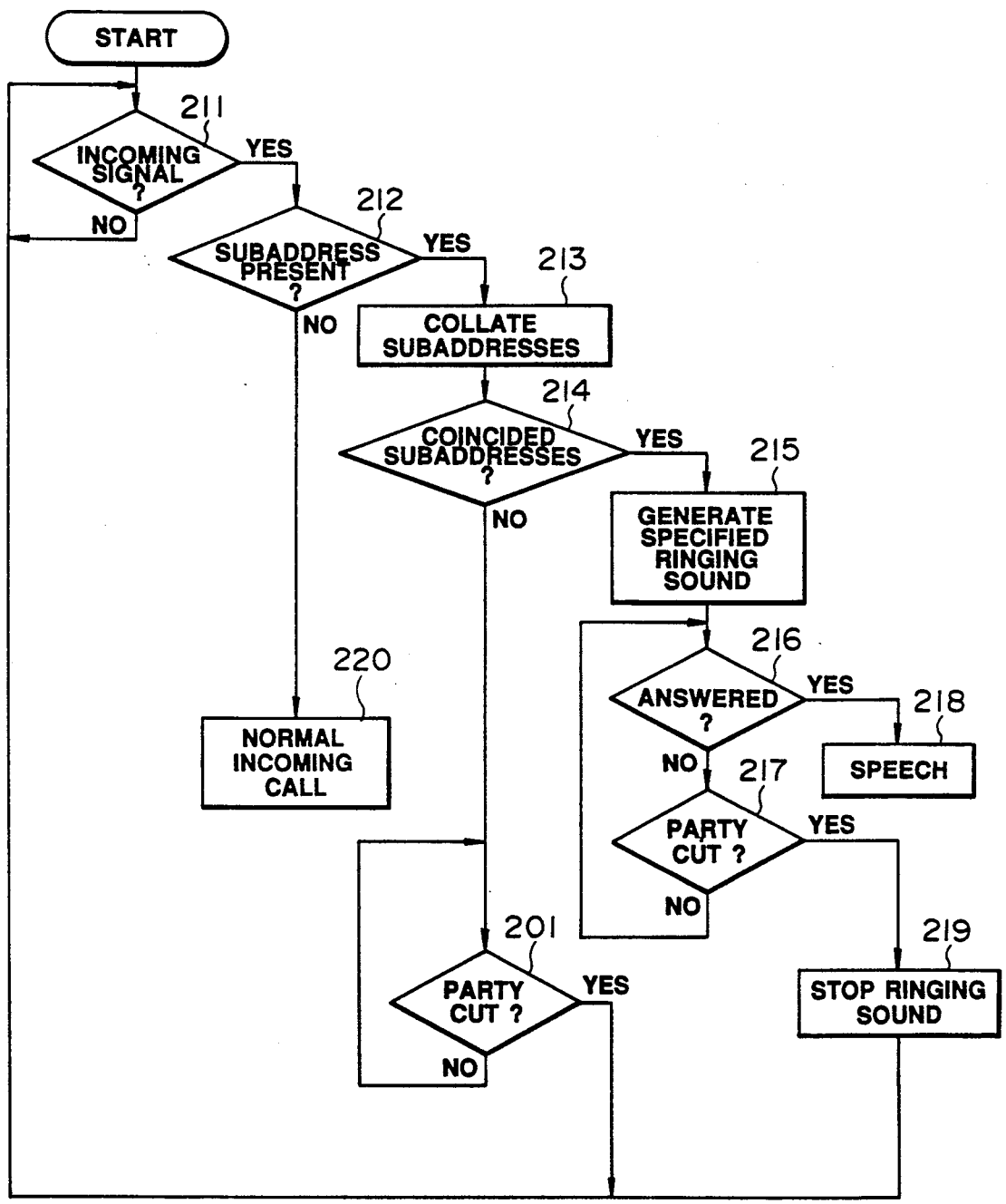
FIG. 10 is a flowchart showing the featured operation of an embodiment.

Consider, in particular, the telephone set P2 of the terminal #1 in FIG. 8. The operation of the telephone set P2 will be explained by referring to a flowchart of FIG. 10.

Assume now that connected to the in-home bus 1 are the telephone set P1 of the terminal #0 to which an incoming subaddress "00H" (where symbol H denotes a hexadecimal notation representation) is set, the telephone set P2 of the terminal #1 to which incoming subaddresses "1AH", "1BH" and "1CH" for individuals A, B and C are set, and the 6 telephone sets P3 to P8 of the terminals #2 to #7 to which any subaddresses are not set.

Figure 12:
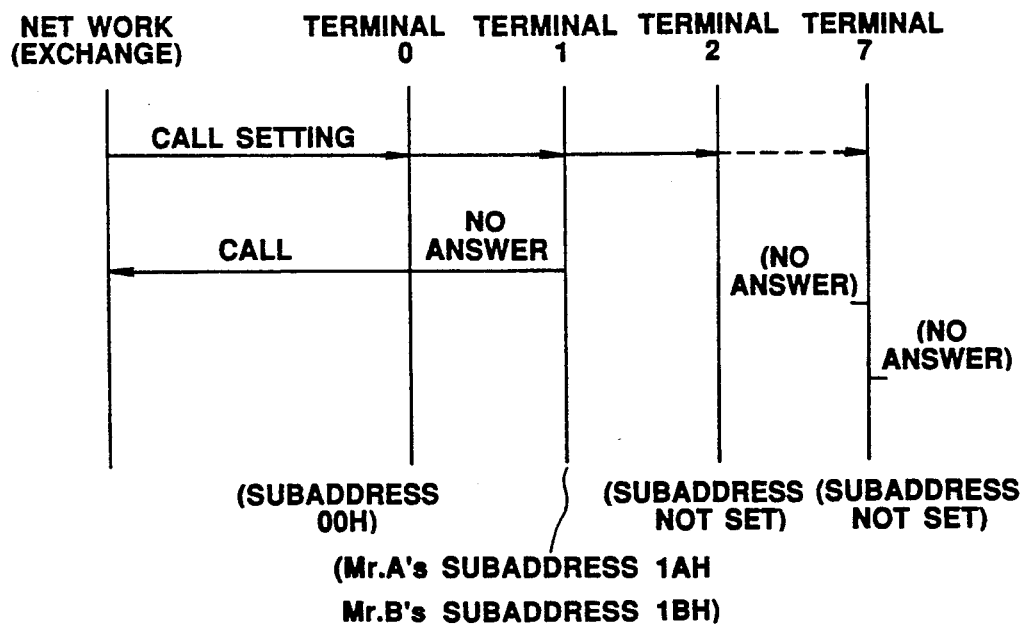

For example, when a caller desires to talk with the individual A, the caller issues a calling signal having the telephone number of the corresponding subscriber line followed by the incoming subaddress "1AH" of individual A added thereto. In the telephone set P2 of the terminal #1, if the controller 6A detects the incoming call signal (step 211), it then checks the presence or absence of the incoming subaddress in the incoming call signal (step 212). The presence of the incoming subaddress causes the controller 6A to enter into step 213 where the called-individual identification-data collating circuit 604 collates the incoming input subaddress with the ones previously stored in the called-individual identification-data storing circuit 603 as shown by the format in FIG. 9. Since the subaddress "1AH" of the received call signal coincides with the A's incoming subaddress previously stored, the controller 6A returns a "call" answering signal from the speech control unit 601 to the network as shown in FIG. 12 (step 214). The controller 6A further controls the ringing-tone switching circuit 605 to specify the tone of the A's ringing signal previously stored, as shown in FIG. 9, i.e., the ringing signal of the tone "A", and issues a ringing-signal generation instruction to the sounder 10 to sound a ringing signal of the tone "A" thereat, thus informing that the incoming call is for the individual A. In this case, the other terminals will not answer the incoming call because the subaddresses of the other terminals do not coincide with the subaddress of the incoming call signal.

Where Mr. A is shifted close to the telephone set P3 of the terminal #2 and Mr. A's incoming subaddress is previously set also at the telephone set P3 of the terminal #2 in the same manner as in the above case, the telephone sets P2 and P3 of the terminals #1 and #2 can ring with the same tone "A" to inform Mr. A of the incoming call. In the case where Mr. A is located close to the telephone set P3 of the terminal #2, if Mr. A's incoming subaddress is set at the telephone set P3 but the telephone set P2 of the terminal #1 is released, then only the telephone set P3 can ring with the tone "A".

Accordingly, when Mr. A's incoming subaddress and ringing tone are previously set at one or some of the telephone sets most favorable to Mr. A, the reception of an incoming call for Mr. A can cause the telephone set closest to Mr. A to ring with the ringing tone allocated to Mr. A, thus informing Mr. A of his own incoming call. Answering to the ringing tone enables Mr. A to talk with the caller party (steps 216 and 218). Mr. A's failure to answer the ringing tone causes the telephone set to continuously ring until the caller cuts his telephone (steps 216 and 217). Hanging up the telephone causes the controller 6A to stop the ringing tone (step 219).

Figure 11:
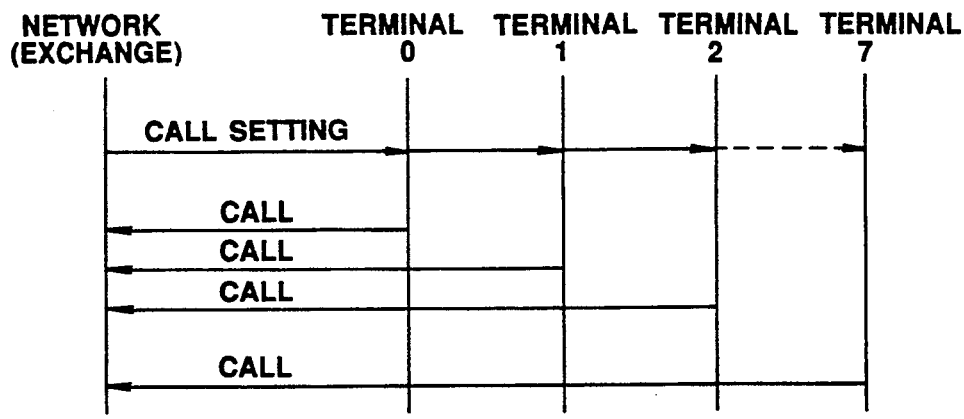
FIGS. 11 and 12 show communication sequences of the present apparatus.

If an incoming subaddress cannot be found in the incoming call signal at the step 212, then all the telephone sets can answer to the incoming call signal as shown in FIG. 11, and can sound the ringing signal of the tone "C", thus informing the users that the incoming call signal contains no incoming subaddress.

In the case where Mr. A is out or cannot leave his seat due to a conference or the like, if a calling rejection label is previously registered, then it becomes highly convenient because it becomes unnecessary for anyone to answer any call to Mr. A during their busy time of work. In this connection, the communication terminal apparatus is provided with an automatic answering function to allow Mr. A to tell the caller his reason for absence through an automatic answering operation, thus realizing a highly convenient and helpful system.

In the present invention, only one terminal or all the 8 terminals may be installed to the in-home bus.

Figure 13:
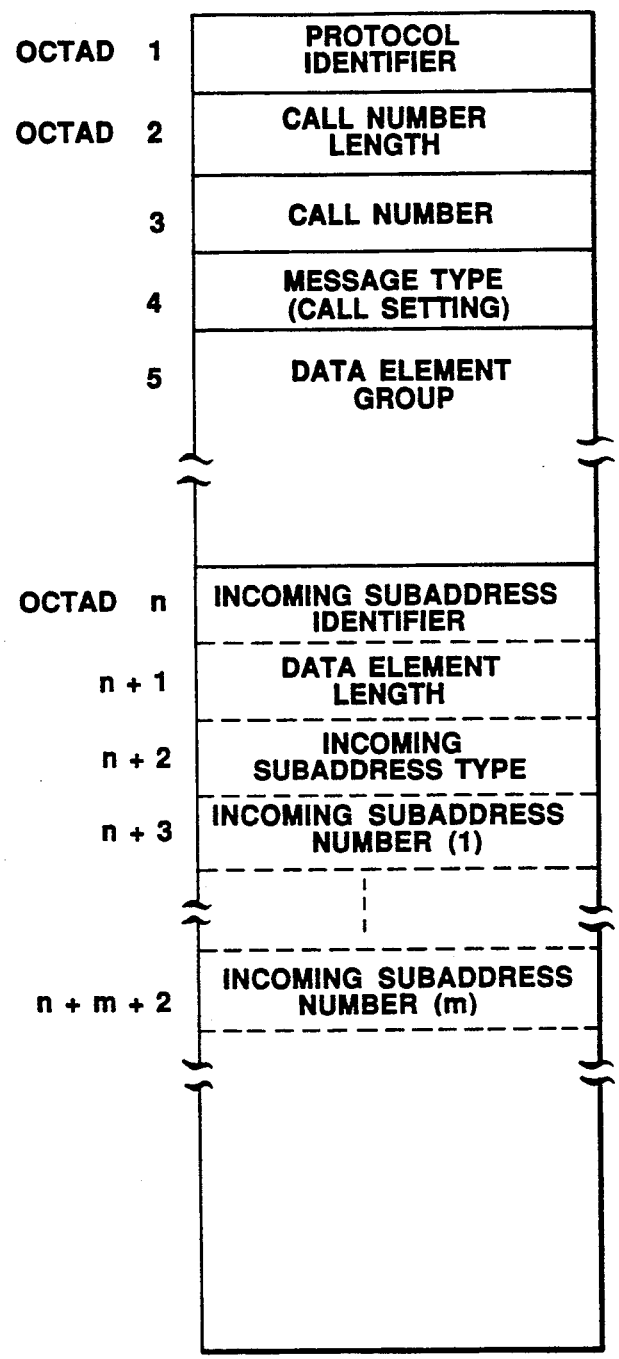
FIG. 13 shows a format of a network control signal.

FIG. 13 shows a format of control data transferred between the communication terminal and the digital network through the D channel.

As illustrated, a message sort is stored in octad 4. For example, in the incoming-call reception mode, a "call setting" message is sent from the network to the terminal.

Placed in octad 5 and subsequent octads are parameters necessary for the respective messages, that is, a group of data elements. In the event where an incoming subaddress identifier is placed in octad n, since incoming subaddress numbers are stored in octad (n+3) and subsequent octads, these are read and collated with the value of the subaddress previously stored.

In this way, in accordance with the present embodiment, a person to whom the incoming call is directed can be immediately determined by the type of the ringing tone, and thus can know his own incoming call. Further, different types of the ringing tones can be allocated to different terminals, so that an incoming call to be answered by a specific person can ring only at the specific terminal positioned close to the person as long as the ringing tone of that person has been previously registered to the terminal to which the person has moved.

Though explanation has been made as to the case where the terminals are telephone sets in the foregoing embodiment, if necessary, the terminals may include a facsimile machine and an electronic mail device so long as they can be connected to the digital subscriber line in-home bus.

A specific person has been called by his specific ringing signal in the foregoing embodiment, but voice data may be registered in place of such ringing tones so that, at the time of receiving an incoming call to the specific person, he can be informed by a loudspeaker of such a voice message ("Mr. A's call" created through speech synthesis), or he may be informed of his incoming call by a visual display message on a character display, such as an LCD (liquid crystal display). The latter cases may be realized by providing a function of controlling these informing operations to the speech controller 601 of the controller 6A.

Further, the individual identification data may be arbitrarily modified and used.

Figure 14:
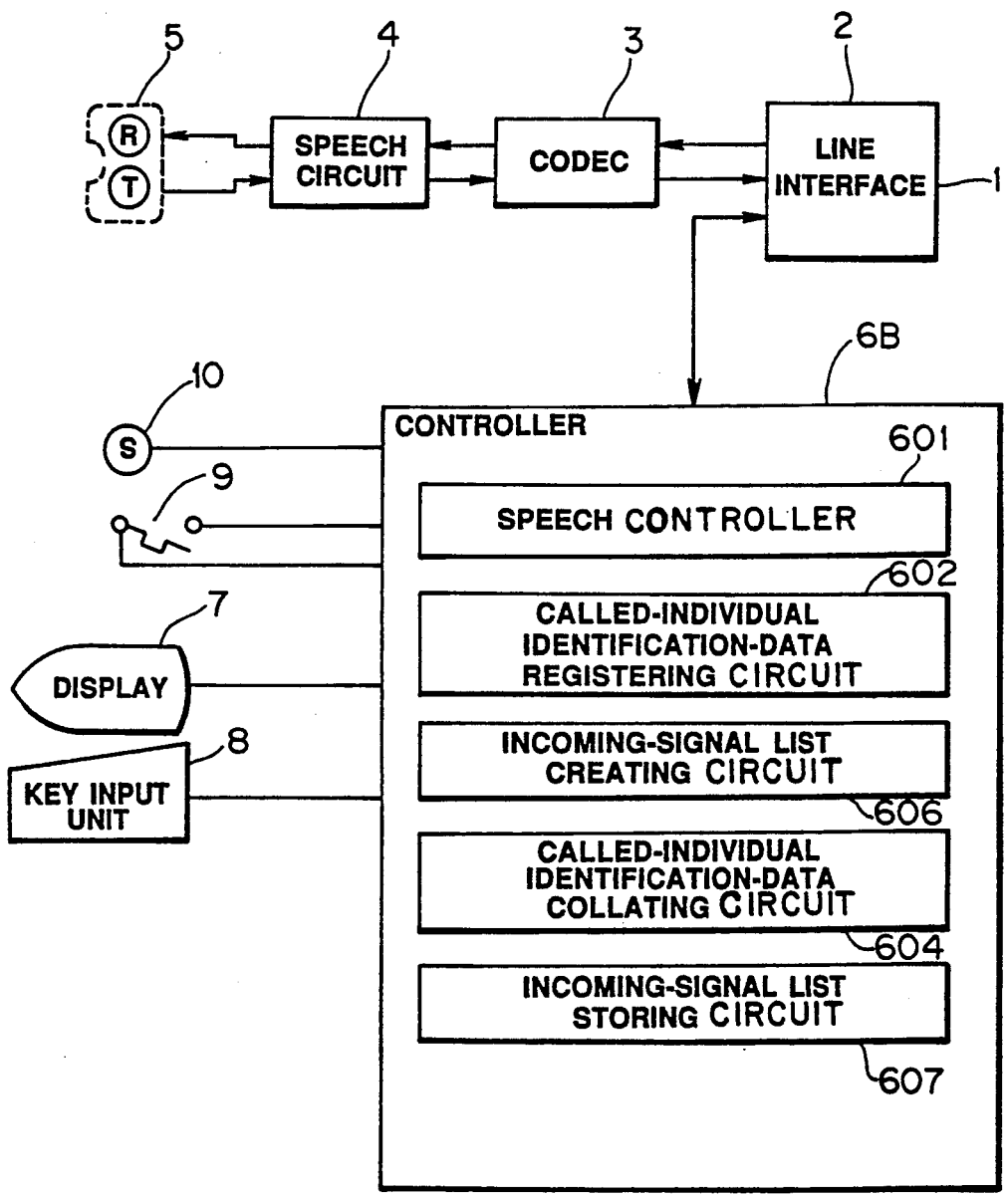
FIG. 14 is a block diagram showing an arrangement of a further embodiment of the present invention.

Referring to FIG. 14, there is shown a block diagram of a telephone set according to a further embodiment of the present invention, in which a controller 6B is a microcomputer which comprises a microprocessor and a main memory. The controller 6B includes the speech controller 601, the called-individual identification-data registering circuit 602, a circuit 606 for storing a list of incoming signals, the called-individual identification data collating circuit 604, and a circuit 607 for creating the list of incoming signals.

The speech controller 601 functions to drive the sounder 10 at the time of receiving an incoming signal, detect the ON or OFF state of the hook switch 9, and so on. The called-individual identification-data registering circuit 602 registers individual identification data (for example, numbers of each 2 figures allocated to individual users) entered through the key input unit 8 in a predetermined area of the incoming-signal-list storing circuit 606. Incoming-signal list data listed as associated caller identification data created by the incoming signal-list creating circuit 606 with called-individual identification data are stored in the incoming-signal-list storing circuit 607 each time the telephone set receives an incoming signal. The called-individual identification data collating circuit 604, when receiving a display request of a caller identification data corresponding to the predetermined called-individual identification data previously entered through the key input unit 8, reads out this caller identification data from the incoming-signal list storing circuit 607 and sends it to the display 7 to be displayed thereon. The incoming-signal-list creating circuit 606 makes a list of caller identification data and called-individual data associated therewith and sends the list to the incoming-signal-list storing circuit 607 to be registered therein each time the telephone set receives an incoming signal.

Figure 15:
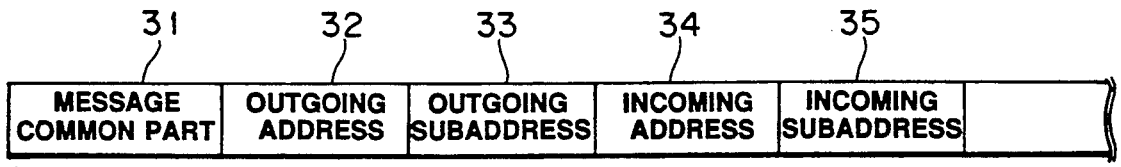
FIGS. 15 and 16 show a data format of a call setting message sent from a digital communication network.
Figure 16:
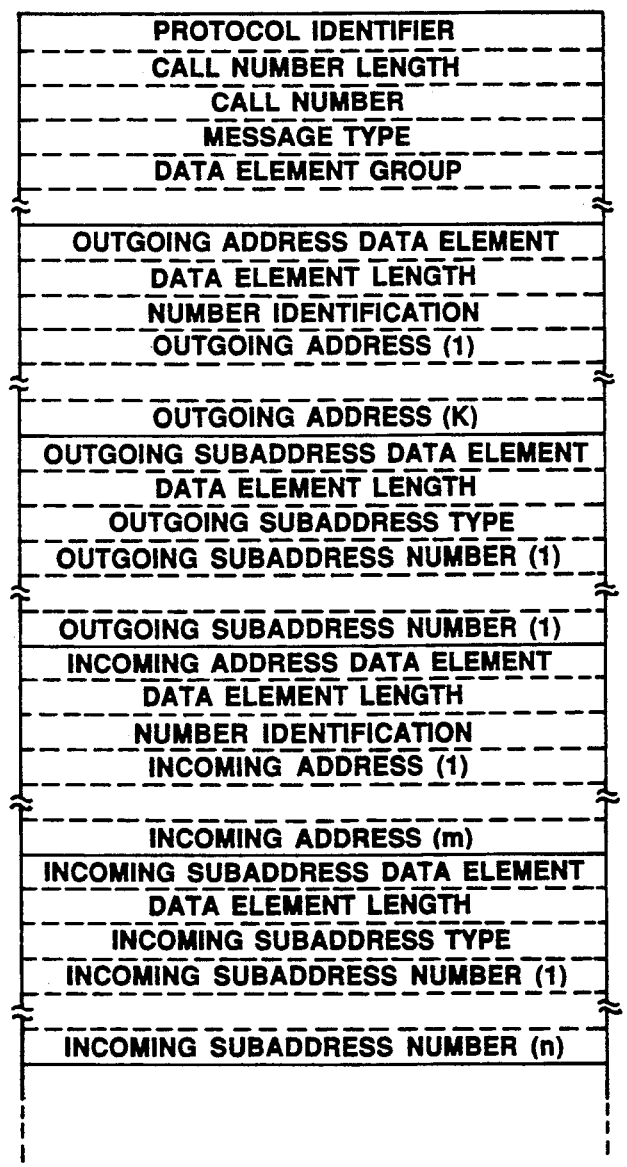

FIG. 15 shows a data format of a call setting message used in the ISDN network to which the above telephone set is connected, and FIG. 16 shows more details thereof. The call setting message sent from the network contains, as shown in FIG. 15, a message common part 31, an outgoing address (caller's telephone number) part 32, an outgoing subaddress part 33, an incoming address (the telephone number of a person to be called) part 34, and an incoming subaddress part 35. These parts are detailed as shown in FIG. 16. It is assumed that transmission is carried out with the called-individual identification data inserted in the incoming subaddress number field in FIG. 16.

Figure 17:
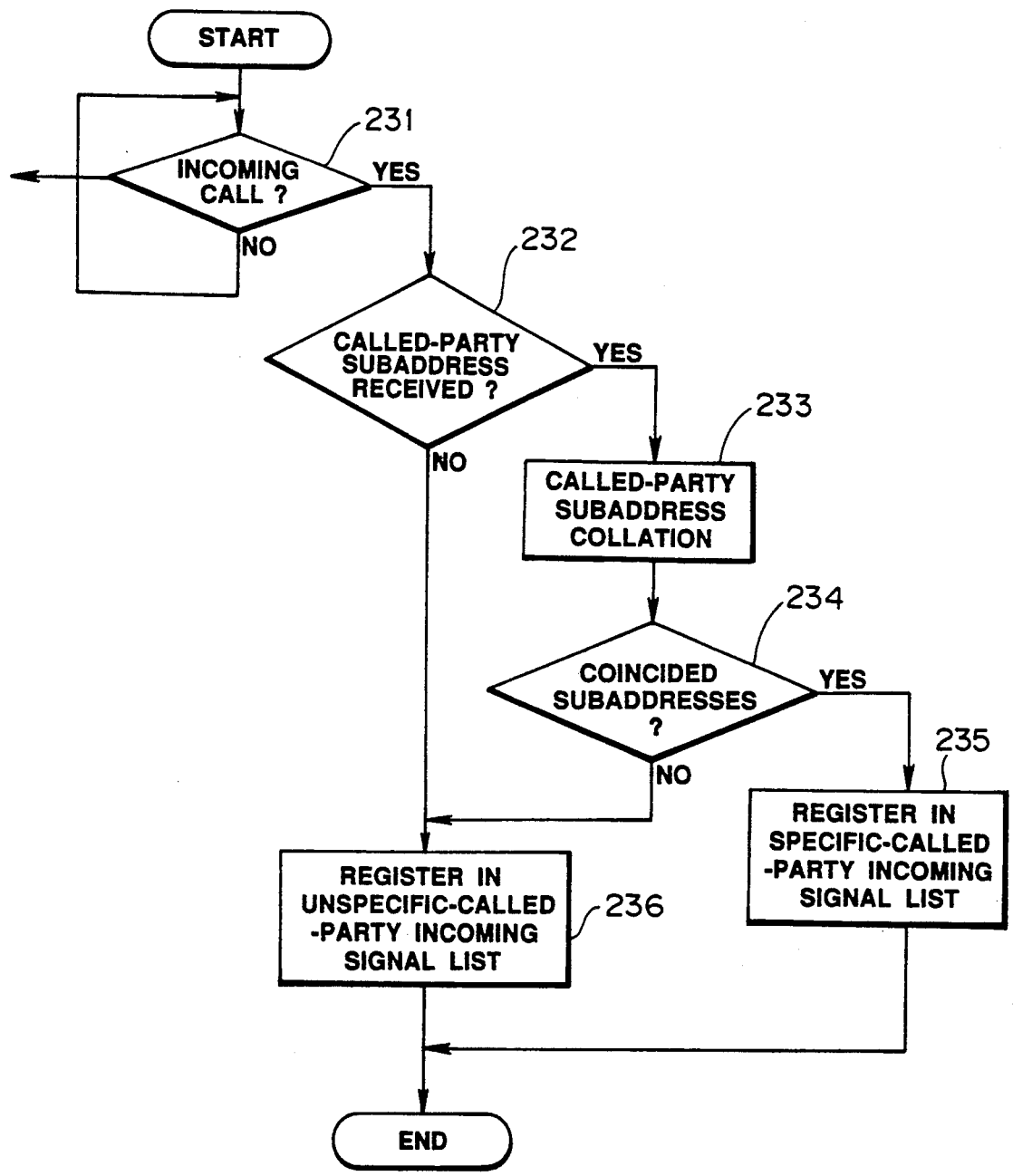
FIG. 17 is a flowchart showing the operation at the time of creating a received-signal list.

When the telephone set terminal receives the aforementioned call setting message, the controller 6B is operated based on the program of a flowchart shown in FIG. 17. More specifically, the controller 6B starts its operation when its power source is turned on, and monitors the absence or presence of an incoming call signal (step 231). The controller 6B, when detecting an incoming call, accepts the call setting message and detects a corresponding incoming subaddress number from the incoming subaddress part 35 (step 232). Prior to this, persons to be called who commonly use the telephone set are previously entered and registered through entry of their own numbers (called-individual identification data), for example, from the key input unit 8. Assume now that 01 and 02 are previously registered as called-individual identification data. The controller 6B having detected the incoming subaddress number, collates the detected incoming subaddress number with the called-individual identification data 01 and 02 (step 233) and checks for coincidence or non-coincidence therebetween (step 234). The controller 6B, when determining a coincidence exists, registers the incoming signal in the specific called-individual list (step 235). Non-coincidence, on the other hand, causes the controller 6B to register the incoming signal in an unspecific called-individual list (step 236), thus terminating the processing.

Figures 18, 19:
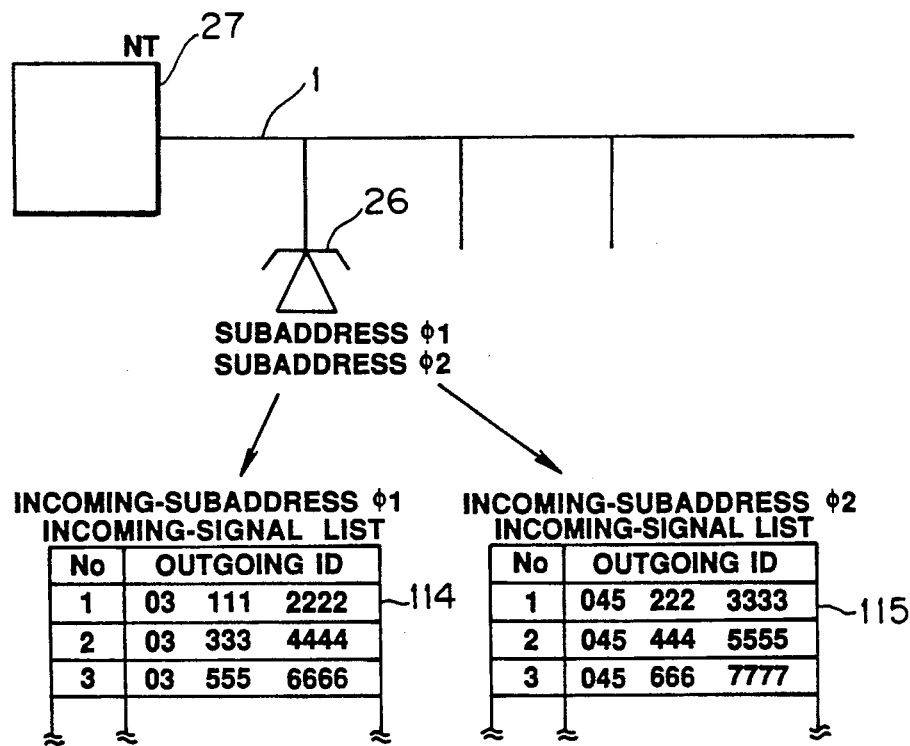
FIGS. 18 and 19 show examples of the received-signal lists stored.

The above incoming signal list is created as shown in FIGS. 18 and 19. In detail, when the telephone set 26 receives a call setting message of such a data format as shown in FIGS. 15 and 16 from the network terminator unit 27 through the in-home bus 1, the incoming-signal-list creating 606, when the transmitted incoming subaddress number is for the called-individual identification data 01, registers the caller identification data in a specific called-individual incoming signal list 114. When the transmitted incoming subaddress number is for the called-individual identification data 02, the incoming-signal-list creating circuit 606 registers the caller identification data in a specific called-individual incoming signal list 115. When the transmitted incoming subaddress number is for data other than the called-individual identification data 01 and 02, the incoming-signal-list creating circuit 606 registers the caller identification data in an unspecific called-individual incoming signal list (not shown). If the called person having the identification data 01 wants to know the caller's identification data of the incoming signal directed to him, then he enters the above identification data 01 and a specific code (for example, #*) through his keying operation of the key input unit 8. This causes the called-individual identification-data collating circuit 604 to read out the caller's identification data from the corresponding specific called-individual incoming signal list 114 and from the unspecific called-individual incoming signal list not shown and to send it to the display 7. As a result, the caller's identification number of the incoming signal directed to the called person of the identification data 01 is indicated on the display 7. Shown in FIG. 19 is another embodiment of the incoming signal list in which the subaddress numbers of incoming signals are associated with the caller's telephone number (identification data). Even in the case where such a list is employed, if the called person wants to display the caller's identification data, then the called-individual identification-data collating circuit 604 reads out the caller's identification data previously stored as associated with the corresponding called-individual identification data (incoming subaddress number or 01 in the above example) or the caller's identification data previously stored as associated with the unspecific called-individual identification data (in the above example, other than 01 and 02) and sends it to the display 7, thus realizing the same display as in the above example.

Although the caller's identification data associated with the called-individual identification data or the caller's identification data associated with the unspecific called-individual identification data upon the called-person's demand has been displayed in the present embodiment, it may be arranged to display only the former data. Up to 8 telephone sets can be connected to the inhome bus of the ISDN network. In this case, if one of the 8 telephone sets corresponds to the present embodiment telephone set, then the users of the 7 other telephone sets can also know their caller's identification data in a similar fashion.

Figure 20:
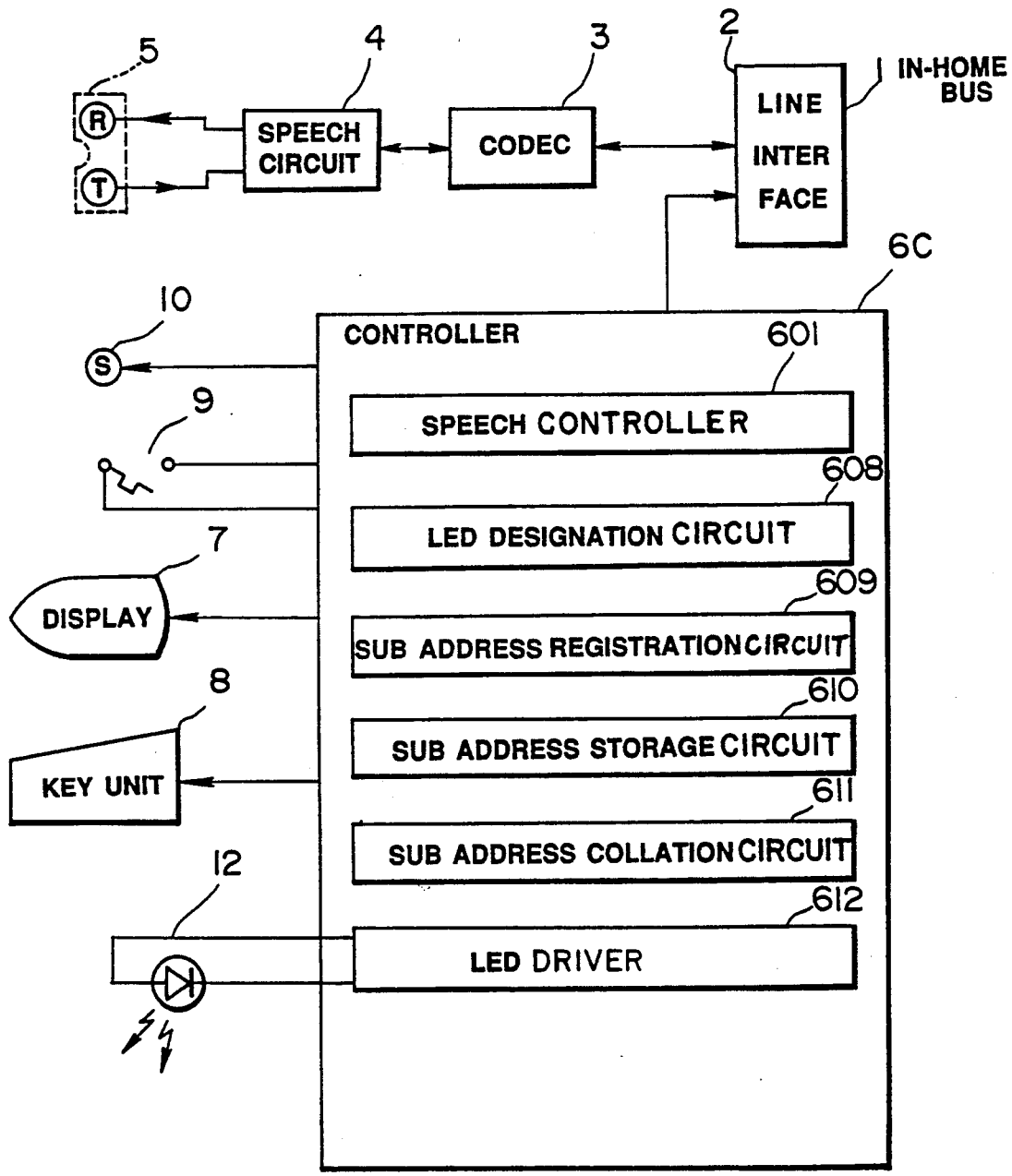
FIG. 20 is a block diagram showing yet another embodiment of the present invention.
Figures 21, 22:
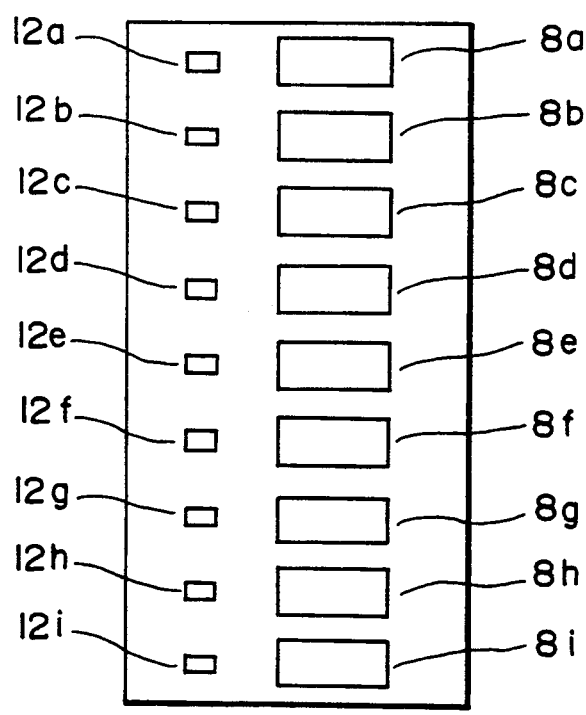
FIG. 21 shows an embodiment of a subaddress storage format.
FIG. 22 is an embodiment of array between keys and LEDs in the present invention.

FIG. 20 is a block diagram showing the arrangement of a telephone set in accordance with yet a further embodiment of the present invention. In the drawing, reference numeral 12 denotes an LED indicator (light emitting diode) comprising a plurality of LEDs. More specifically, the LED indicator 12 comprises LEDs 12a to 12i arranged as associated with designation keys 8a to 8i of the key unit 8 as shown in FIG. 22. The LEDs 12a to 12i are designated by respective LED numbers to be controllably driven according to the numbers.

A controller 6C in the telephone set of the present embodiment, which forms a control core for the entire apparatus, comprises a speech controller 601, an LED designating circuit 608, a subaddress registering circuit 609, an address storing circuit 610, a subaddress collating circuit 611, and an LED driver 612. Among those elements, the speech controller 601 functions to drive the sounder 10, detect the state of the hook switch 9, and so on.

The LED designating circuit 608 stores LED number data on some of the LEDs entered through the key unit 8 into an LED number holding area of the subaddress storing circuit 610. The subaddress registering circuit 609 stores or registers a subaddress entered through the key unit 8 into a subaddress area of the subaddress storing circuit 610.

The subaddress storing circuit 610 stores therein the LED number designated by the LED designating circuit 608 and the subaddress registered by the subaddress registering circuit 609 in associated relation with each other.

The subaddress collating circuit 611 collates the subaddress of the received signal with the subaddress previously stored in the subaddress storing circuit 610, and when finding coincidence in subaddresses, the subaddress collating circuit 611 gives an instruction to the LED drives 612 to light one of the LED 12 corresponding to that subaddress.

In the present embodiment, up to 8 terminals connected to the in-home bus 1 are associated with the LEDs 12a to 12i and the subaddresses of the terminals associated with the LEDs 12a to 12i are previously registered, so that one of the LEDs corresponding to a subaddress coincidence determined through collation between the subaddress of the received signal and the registered subaddresses can be lighted to inform the users that the incoming call signal is directed to the corresponding user.

An example of such a method of setting and registering LEDs and subaddresses will be explained in the following.

Assume, for example, that keys 8a to 8n and the LEDs 12a to 12n are located as shown in FIG. 22, and it is desired to light the LED 12a receiving a subaddress "OOH" (where symbol H denotes a hexdecimal notation representation).

In this case, the user first depresses the key 8a to select the LED 12a and then enters "00" through dial key of the key unit 8. The additional depression of the key 8a causes the LED designating circuit 608 and subaddress registering circuit 609 in the controller 6C to carry out their LED designation and subaddress registration through this sequential key-input operations respectively, thus completing the LED/subaddress setting operation. The same procedure is similarly repeated when it is desired to set the other LEDs.

Through such procedure, LED numbers and subaddresses in associated relation with each other are stored in a memory part of the subaddress storing circuit 610 in the controller 6C to have a format as shown in FIG. 21.

A setting flag in FIG. 21 indicates whether or not its LED setting has been made, that is, the setting flag is "1" when the LED setting has been made and is "0" when it has not been made.

When the setting of whether to ring the associated telephone set for the incoming signal is selected, a signal sent to the associated sounder 10 selectively rings the sounder.

Further, when it is desired not to ring the particular telephone set even when an incoming signal is directed thereto, it may be arranged not to ring the particular telephone set.

Figure 23:
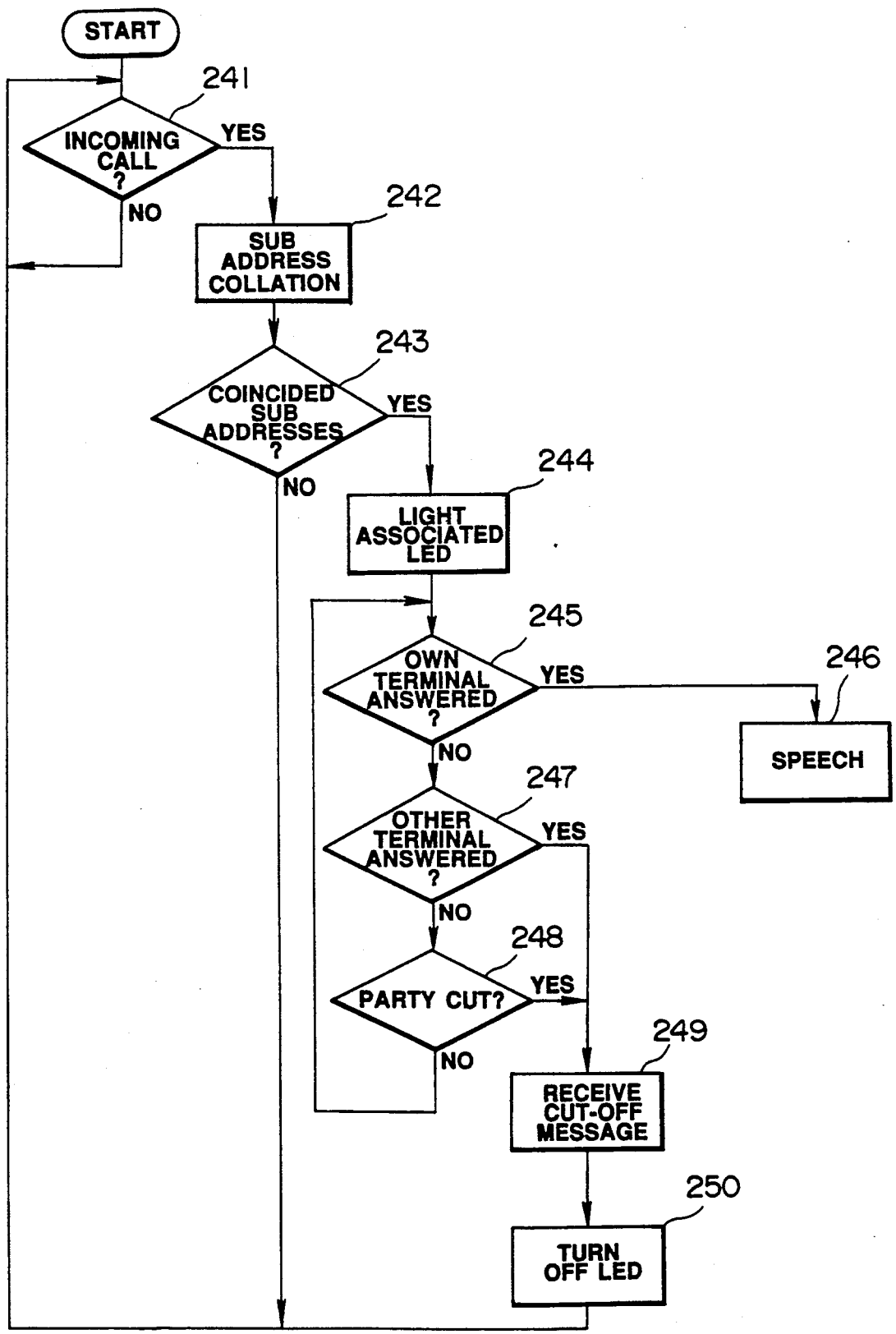
FIG. 23 is a flowchart showing the featured operation of a present embodiment.

The operation of the terminal apparatus of the present invention in the incoming-call reception mode will next be explained by referring to a flowchart shown in FIG. 23.

It is now assumed that two telephone sets having their subaddress "OOH" and "37H" set therefor are connected to the in-home bus with the telephone set having a subaddress of "OOH" being a base set.

In step 241, when the base telephone set receives an incoming call signal including a subaddress, the subaddress collating circuit 611 of the controller 6C collates the subaddress of the received incoming signal with the subaddresses previously stored as shown by the format in FIG. 21 (step 242). If the controller 6C receives the subaddress "OOH", then it finds a subaddress coincidence in step 243. As a result, the LED circuit 612 is operated to light the associated LED 12a. Further, the controller sends a signal to the sounder 10 to generate a ringing sound, thus informing the user of the presence of the incoming call. In response to the ringing tone, when the user picks up the handset of the telephone set to put the telephone in its off-hook state, the controller 6C proceeds to step 246 where the user can talk with the calling party.

If the subaddress of the received incoming call signal is "37H", then the LED 12d is lighted in step 244 under such registration conditions as shown in FIG. 21 and further the telephone set of the subaddress "37H" begins ringing to inform the user that the incoming call is for the user of the 37H telephone set.

An user's off-hook operation of the telephone set having the subaddress "37H" causes the controller 6C to receive a "cut-off message" from the network (step 249), which causes the LED 12d to be put out by the LED driver of the controller 6C.

In the above case, if it is arranged that a user's depression of the designation key 8d in the key unit 8 to enable an answer to the incoming signal, then this can conveniently eliminate the need for the user to go to the telephone set of the subaddress "37H".

In the incoming-signal reception mode, if the incoming signal does not include a subaddress, then the LED 12i registered as NONE or the absence of subaddress may be lighted, or all the LEDs may be lit to inform the users that the incoming call signal does not include a subaddress.

The notification of the incoming signal to the users has been realized by lighting the LEDs related to the terminals in the present embodiment, but the notification may also be realized by selectively sounding, at the time of receiving an incoming signal, associated one of different sorts of ringing tones or message tones previously allocated to the respective terminals to selectively tell the user the presence of the incoming signal.

Furthermore, any number of the 8 telephone sets may be installed and used to the in-home bus in exactly the same manner.

Although explanation has been made in the case where the telephone set or sets as an example, are used as the terminal apparatus in the foregoing embodiment, the telephone set or sets may be replaced with facsimile machines, electronic mail devices or the like so long as they can be connected to the in-home bus of the digital subscriber line. In addition, display has been realized by means of the LED, but other suitable display element may be employed.

Figure 24:
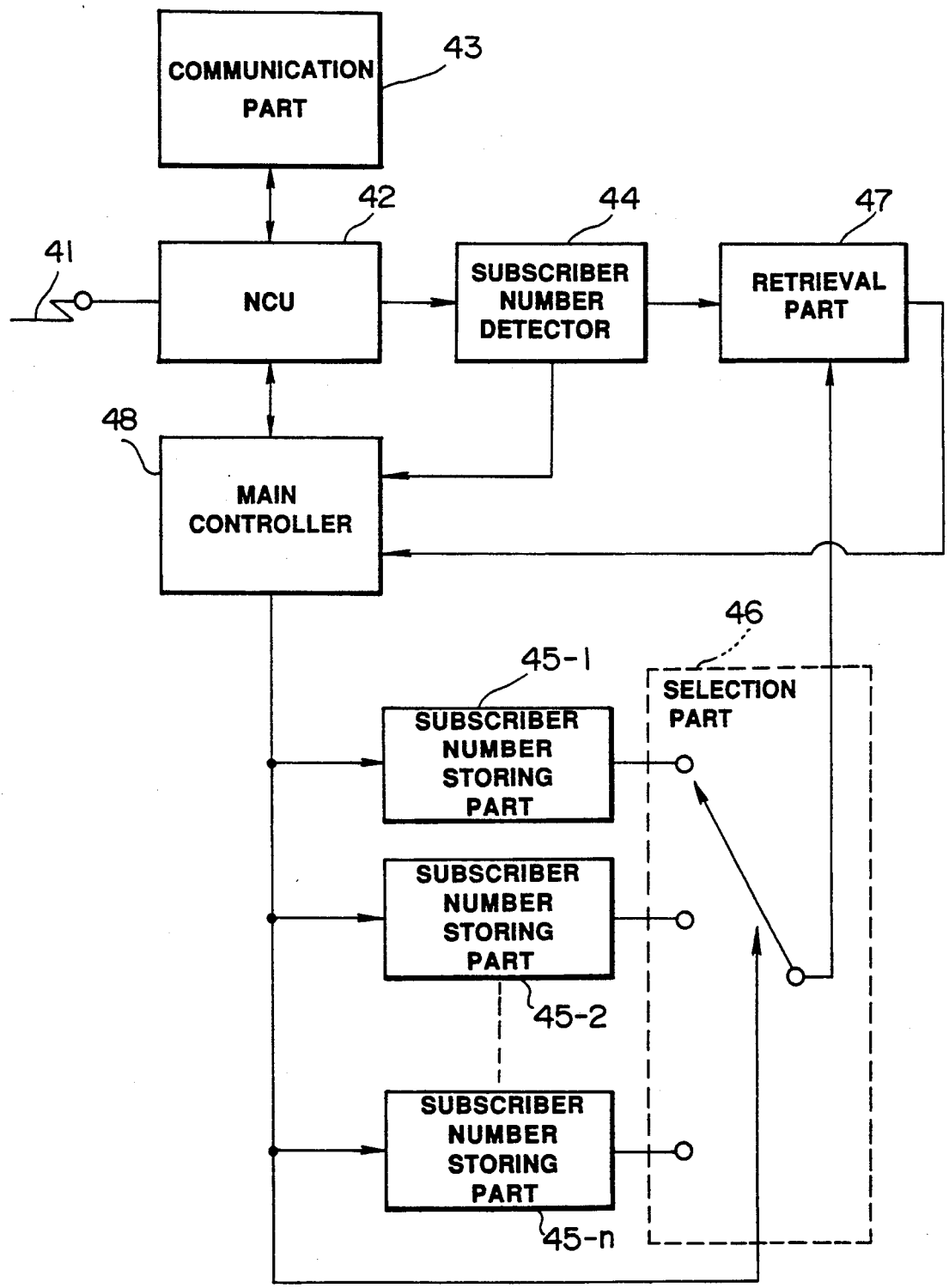
FIG. 24 is a block diagram showing yet a further embodiment of the present invention.

Referring to FIG. 24, there is shown a block diagram of a communication terminal apparatus in accordance with yet another embodiment of the present invention. The apparatus of the present embodiment comprises a network control unit (NCU) 42 for executing a line interconnection procedure with an ISDN line 41, a communication part 43 for performing communication (speech in the case of telephone set and transmission and reception of picture signals in the case of facsimile machine) through the NCU 42, a subscriber-number detecting part 44 for determining whether or not an incoming call signal contains the number of the subscriber as the call originator and further for detecting the subscriber number if contained, n sets of subscriber-number storing parts 45-1 to 45-n, each set consisting of a plurality of call-originator subscriber numbers which are used to grant the acceptance of the incoming signal, a selection part 46 for selecting one of these subscriber-number storing parts 45-1 to 45-n, a retrieval part 47 for checking whether or not the same number as the call-originator subscriber number detected by the subscriber-number detecting part 44 is stored in any one of the subscriber-number storing parts 45-1 to 45-n selected by the selection part 46, and a main controller 48 for granting the acceptance of the incoming signal on the basis of the result determined by the retrieval part 47.

Figure 25:
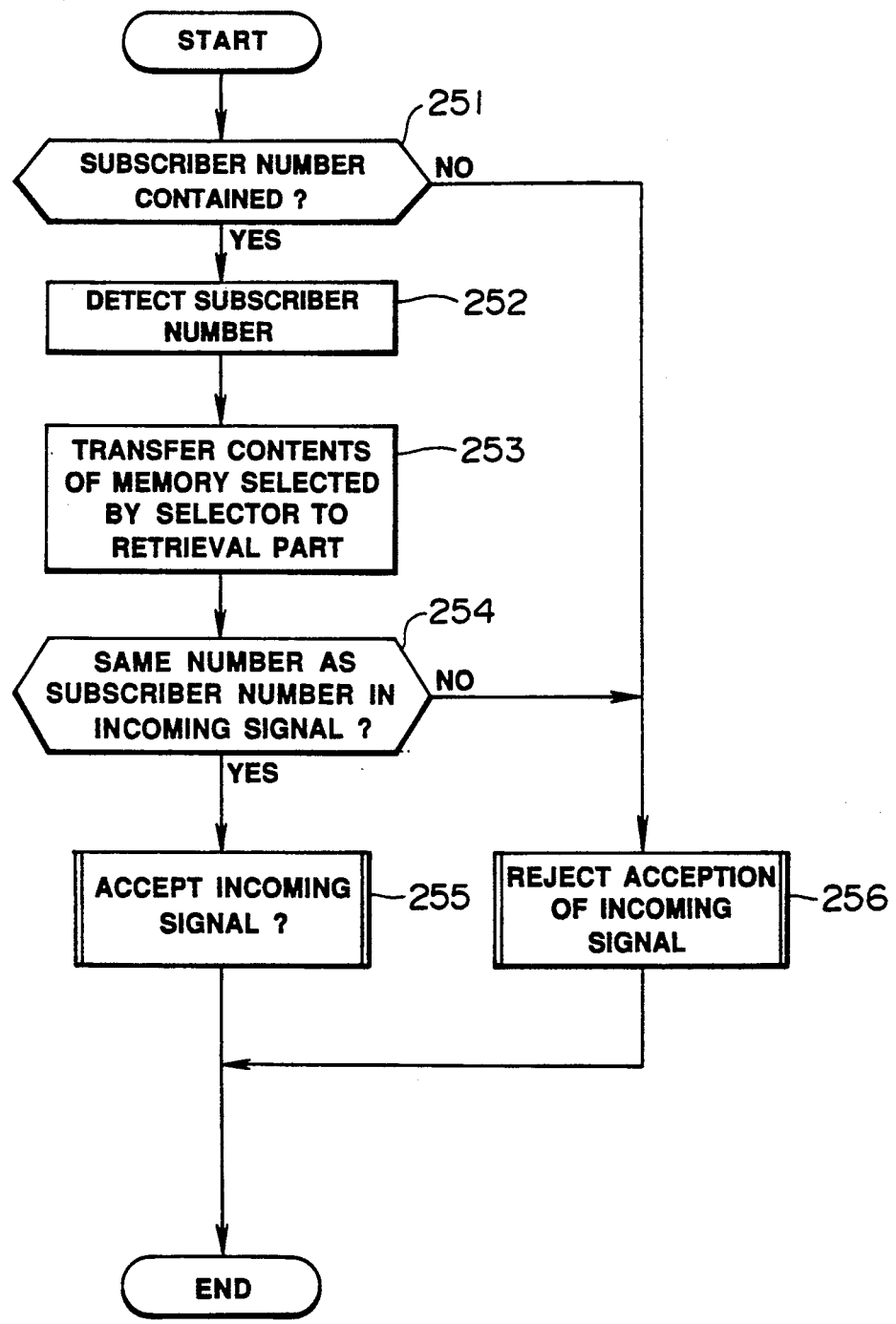
FIG. 25 is a flowchart showing the operation of the embodiment of FIG. 24 in its signal reception mode.

FIG. 25 shows a flowchart showing the operation of the above arrangement for receiving an incoming signal.

The NCU 42, when receiving an incoming signal from the ISDN line 41, first transfers the incoming signal to the subscriber-number detecting part 44 according to an instruction from the main controller 48. The subscriber-number detecting part 44 checks if the received incoming signal contains a call-originator subscriber number (step 251), and when determining that such a number is not contained, informs the main controller 48 to that effect. In response to the notification, the main controller 48 orders the NCU 42 not to execute the subsequent interconnection control procedure for the incoming signal. This prevents any incoming signal having an unregistered call-originator subscriber number from being accepted.

If the incoming signal contains a call-originator subscriber number, on the other hand, then the subscriber-number detecting part 44 detects the subscriber number (step 252) and transfers it to the retrieval part 47. The retrieval part 47, when receiving the detected subscriber number, retrieves the subscriber-number storing part (for example, 45-1) selected by the selection part 46 to check whether or not the same subscriber number as the subscriber number detected by the subscriber-number detecting part 44 is stored in the subscriber-number storing part 45-1 (steps 253 and 254). When the retrieval part 47 determines that the same subscriber number is stored, it informs the main controller 48 which results in the subsequent interconnection control procedure being carried out by the NCU 42. As a result, the incoming signal issued from the call originator can be normally accepted at the terminal apparatus (step 255). If the same subscriber number is not stored however, then the retrieval part 47 informs the main controller 48 to prevent the acceptance of the incoming signal.

Therefore, by arbitrarily combining the stored contents of the subscriber-number storing parts 45-1 to 45-n and the selected contents of the selection part 46, call originators corresponding to incoming signals can be selected in various manners.

Assuming, for example, that subscriber numbers corresponding to companies A, B, C, D, E ... are previously stored respectively in the subscriber-number storing parts 45-1 to 45-n and the selection part 46 is set to sequentially select these subscriber-number storing parts 45-1 to 45-n on an hourly basis, then the incoming signal only from the company A can be accepted during the first hour, the incoming signal only from the company B can be accepted during the second hour, and so on.

Various other application methods may be realized depending on user's application purpose.

For example, the apparatus may be arranged during the night to accept an incoming signal only from the police and fire stations and relatives, whereby any disturbance of sleep due to mischievous, prank phone calls can be prevented. When the present invention is used in information collection fields, it may be arranged to accept only incoming signals of subscriber numbers having a particular set of numbers or area codes, in which case information collection can be attained according to the location.

In this way, the present embodiment can selectively answer only to desired parties.

Although a set of subscriber numbers has been stored in each of the subscriber-number storing parts 45-1 to 45-n in the foregoing embodiment, only a single subscriber number may be stored in each of the subscriber-number storing parts when the present invention is used where the number of incoming signals is relatively small. Further, only one of the subscriber-number storing parts 45-1 to 45-n may be provided and the stored contents of the one subscriber-number storing part may be manually or automatically switched to accept the incoming signal only from a desired party. In this case, the selection part can be eliminated. Furthermore, the present invention is not limited to telephone sets and facsimile machines but can be applied to various sorts of communication terminals utilizing the ISDN.

Figure 26:
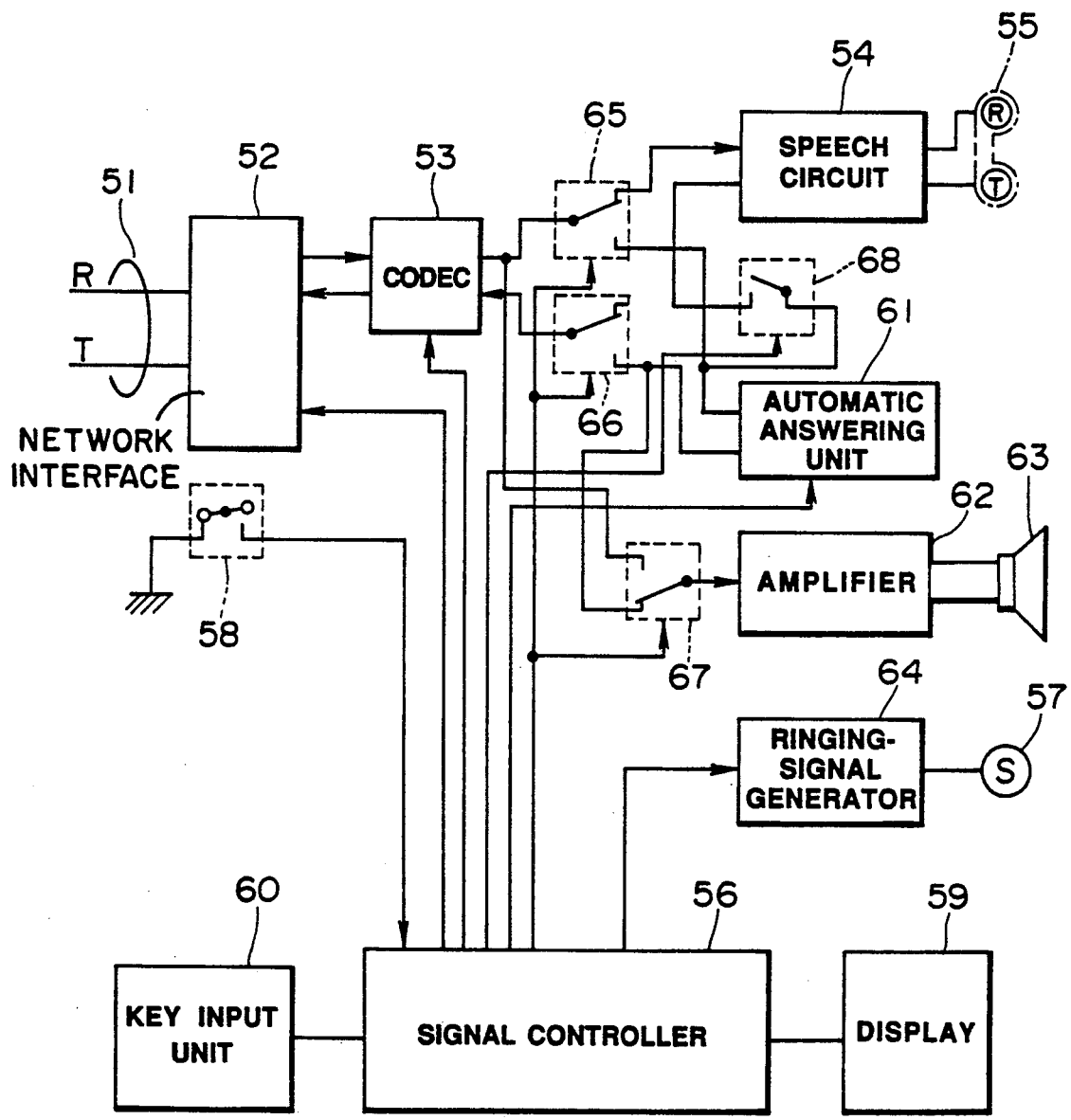
FIG. 26 is an arrangement of a telephone set having an automatic answering function in accordance with other embodiment of the communication terminal apparatus of the present invention.

There is shown a block diagram of another embodiment of the communication terminal apparatus in accordance with the present invention in FIG. 26, in which a network interface 52 functions to decompose a digital signal received thereat from an in-home bus 51 of the digital communication network into two channels, i.e., B channel (data channel) and D channel (signal channel), or to compose the B and D channels to form the digital signal. The B channel is used for data transfer between the network interface 52 and a codec 53, while the D channel is for data transfer between the network interface 52 and a signal controller 56. A speech circuit 54 is connected through send/receive-signal-line changeover switches 65 and 66 to the codec 53 to drive the transmitter or receiver of a telephone handset 55.

An automatic answering unit 61 is connected through the switches 65 and 66 to the codec 53 to record call senders' messages, and also connected through a switch 68 to the speech circuit 54 to record the telephone owner's message with use of the handset 55. An amplifier 62 is connected to a switch 67 for switching the input of the amplifier, to amplify an incoming signal received from the switch 67 or to amplify sound received from the automatic answering unit 61 to thereby drive a loudspeaker 63.

A ringing signal generator 64 generates a ringing signal under control of the signal controller 56 to drive a sounder 57 which generates a ringing sound. A hook switch 58 provides an off-hook or on-hook signal to the signal controller 56. A key input unit 60, when operated, sends data based on the operation of the key input unit 60 to the signal controller 56. A display 59 indicates thereon various messages from the signal controller 56.

Figure 27:
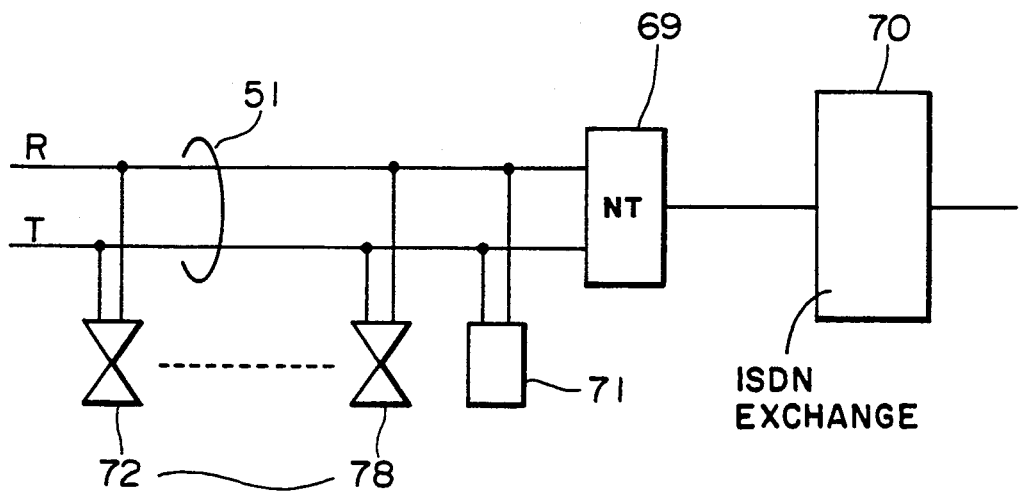
FIG. 27 is an example of wiring of a digital subscriber line home bus.

Shown in FIG. 27 is a wiring diagram showing interconnections between the in-home bus 51 of the digital communication network subscriber line, a communication terminal apparatus 71 of the present invention, other communication terminals 72 to 78, and an exchange 70 for the ISDN (integrated services digital network).

The digital subscriber line in-home bus 51 contains 2 B channels (data channels) of each 64 kbps (kilobits/-seconds) and a D channel (signal channel) of 16 kbps signals. These channels are multiplexed on a time division basis through the network interface 52 and the codec 53 and are transferred between the communication terminals 71 to 78 and a network terminating unit 69.

Figure 28:
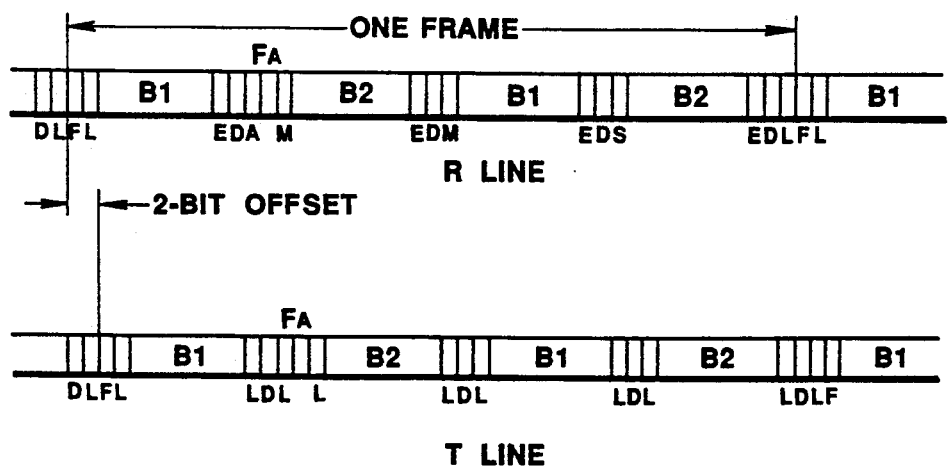
FIG. 28 shows bit configurations of one frame on signal reception (R) and signal transmission (T) lines of the digital subscriber line home bus.

FIG. 28 shows a bit pattern corresponding to one frame on a signal reception line (R line) and a signal transmission line (T line) of the subscriber in-home bus 51 of the digital communication network.

Figure 29:
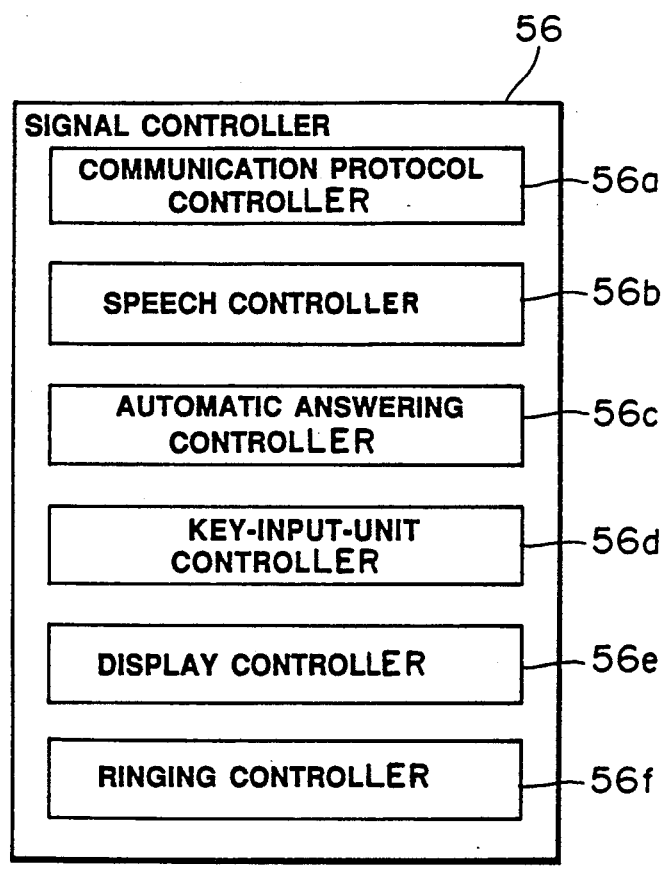
FIG. 29 shows details of a signal controller in the embodiment of the present invention.

Referring to FIG. 29, there is shown an arrangement of the signal controller 56, in which a communication protocol controller 56a controls a communication protocol using the D channel between the network interface 52 and the signal controller 56.

Figure 30:
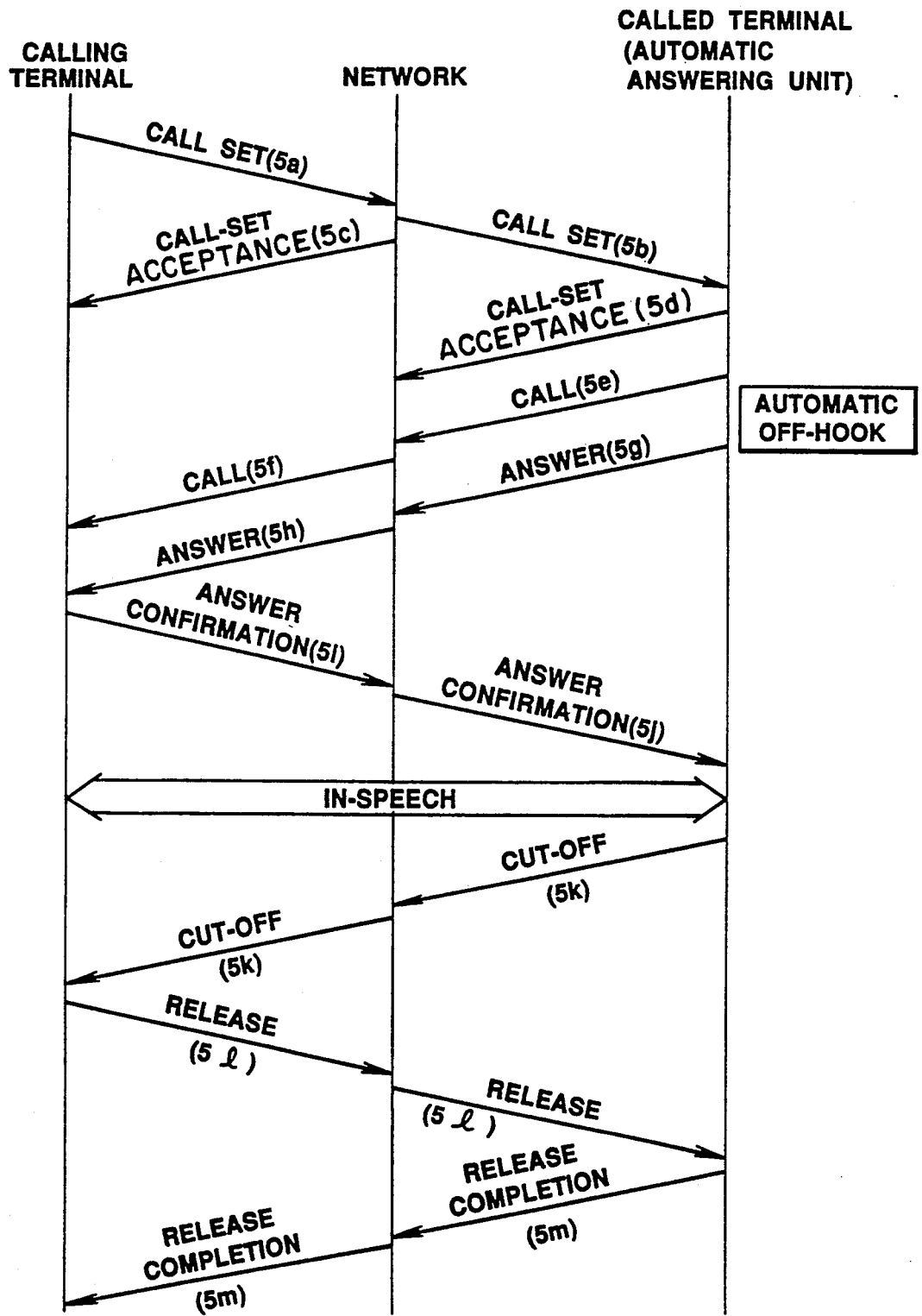
FIG. 30 shows a message sequence carried out based on a communication protocol in the digital subscriber line home bus.

FIG. 30 shows messages transfers for an outgoing call, incoming call, cut-off and so on issued based on the aforementioned communication protocol in transfer control. When it is desired to issue an outgoing call, the caller communication terminal issues a call setting message (5a) to the network. The network, when receiving the message, issues a call setting message (5b) to a terminal as a call receiver and also sends a call-setting acceptance message (5c) back to the caller terminal. The call receiver terminal, when receiving the call setting message (5b), sends a call-setting acceptance message (5d) and a ringing message (5e) back to the network. The network, when receiving the ringing message (5e), sends a calling message (5f) to the caller terminal. An automatic off-hook operation at the call-receiver terminal causes the receiver terminal to send an answering message (5g) to the network, which in turn returns an answering message (5h) to the caller terminal. Thereafter, the caller terminal returns an answer confirmation message (5i) to the network, which in turn returns an answering confirmation message (5j) to the receiver terminal, whereby speech or communication can be realized between the caller and receiver terminals. When the speech or communication is completed and turned off by the receiver terminal, the receiver terminal sends a cut-off message (5k) to the caller terminal through the network. The receiver terminal, when receiving the cut-off message (5k), sends a release message (5l) to the receiver terminal through the network. The receiver terminal having received the release message (5l) sends a release completion message (5m) to the caller terminal through the network.

Figure 31:
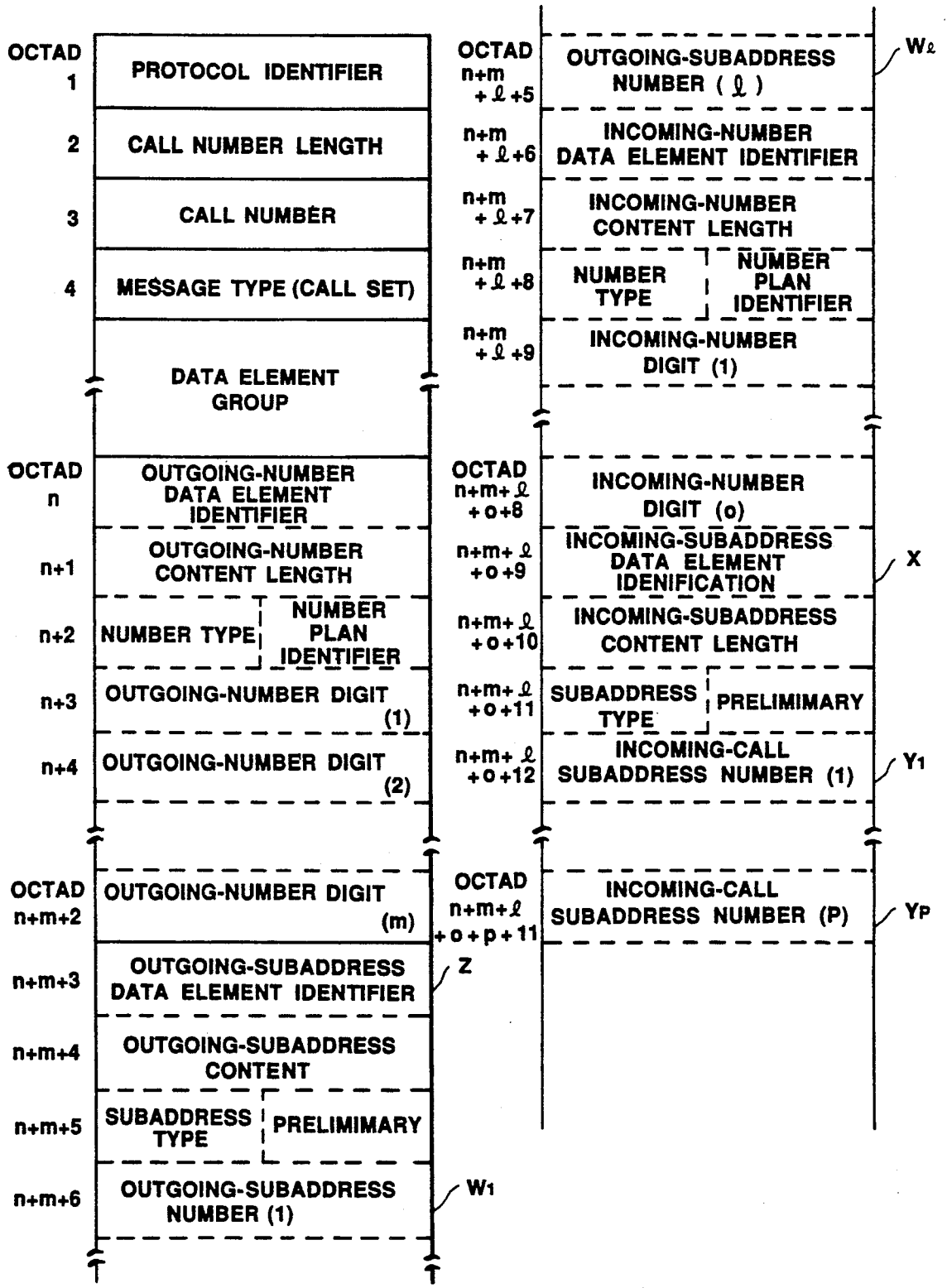
FIG. 31 shows a part of the call setting message.

Shown in FIG. 31 is a part of the call setting message (5b) issued from the network to the receiver terminal. The communication protocol controller means 56a in FIG. 29 finds, for example, incoming-call subaddress data element identifier X in the call setting message (5b) and sends an incoming-call subaddress number Y to an automatic answering control means 56c of the signal controller 56. The automatic answering controller 56c, when receiving the incoming-call subaddress number Y, collates the number Y with the incoming-call subaddress numbers previously stored, and when finding a coincidence therebetween, issues an automatic-answering response message under control of the communication protocol controller 56a. As a result, the automatic answering unit 61 is driven by the automatic answering controller 56c to execute the automatic-answering response.

A speech controller 56b in the signal controller 56 functions to turn the switches 65, 66, 67 and 68 respectively on or off to control the speech channel.

A display controller 56e in the signal controller 56 writes data to be displayed on the display 59 and controls the display 59.

A ringing controller 56f of the signal controller 56 functions to receive an instruction from the communication protocol controller 56a and to cause the sounder 57 to generate a ringing tone under control of the ringing signal generator 64.

Figure 32:
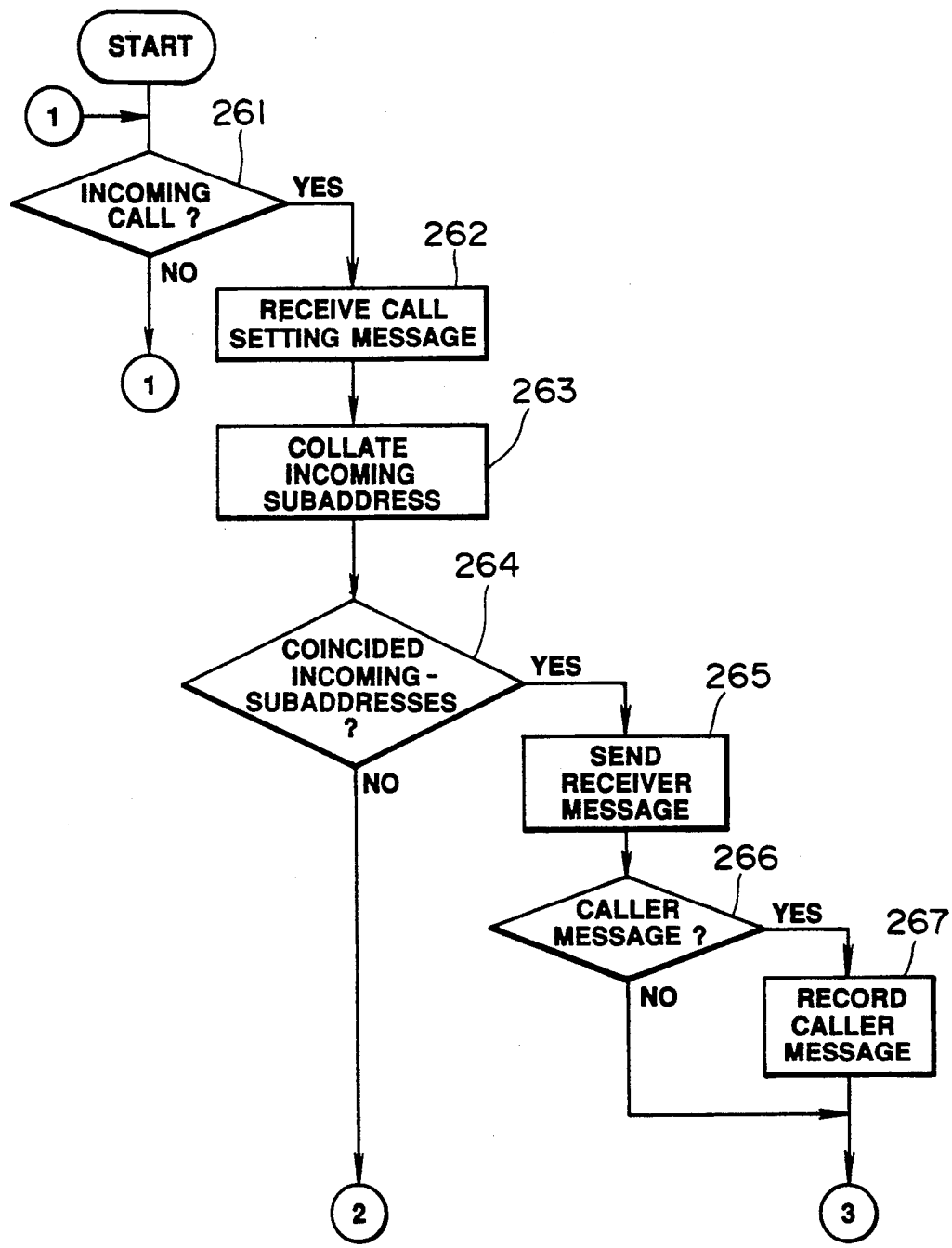
FIGS. 32 and 33 show a flowchart of an embodiment of the present invention.
Figure 33:
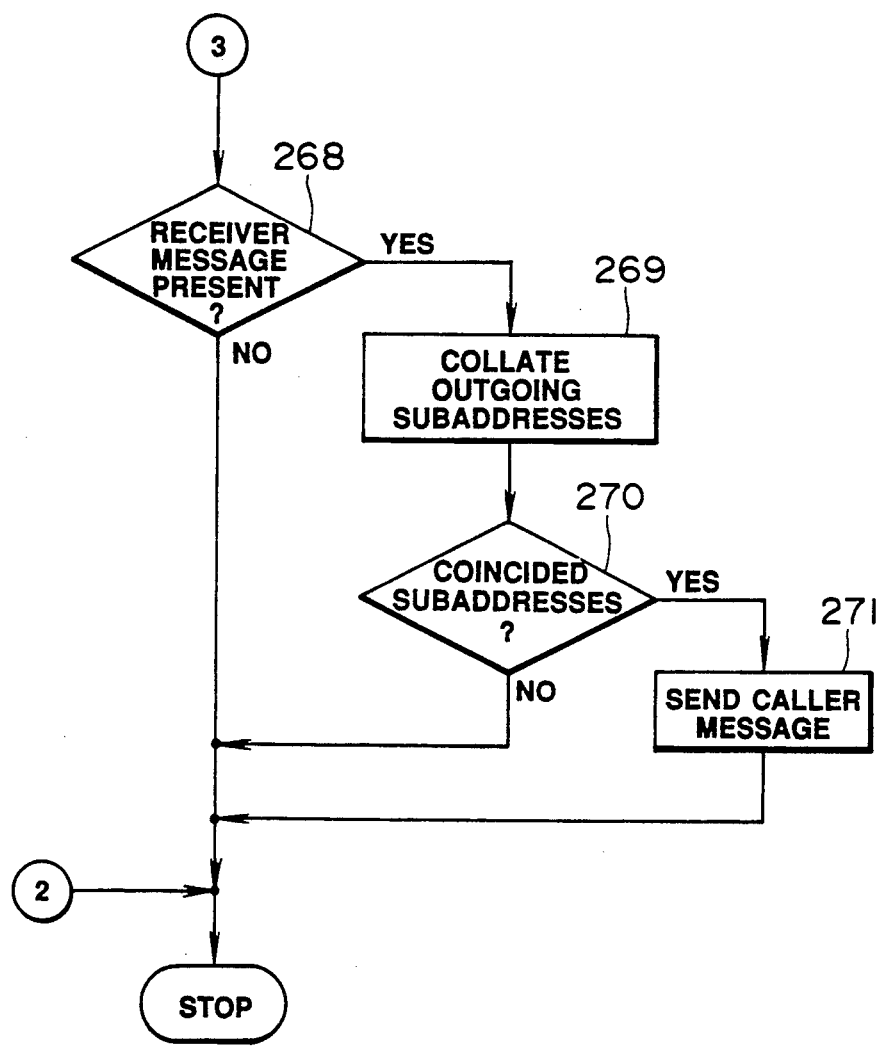

The operation of the present embodiment as mentioned above will be explained by referring to a flowchart of FIGS. 32 and 33. The operational procedure based on this flowchart is previously stored in a storage part (not shown) of the signal controller 56 and is controlled by the signal controller 56 according to this flowchart. Assume now that such a telephone set as shown in FIG. 26 is set to activate its automatic answering function.

The signal controller 56 monitors the generation of an incoming call (step 261). During the monitoring operation, if the signal controller 56 confirms the generation of an incoming call, then it receives the call setting message (5b) from the network (step 262). At this time, the communication protocol controller 56a of the signal controller 56 finds an outgoing-subaddress data element identifier Z and the incoming-subaddress data element identifier X from the call setting message (5b), sends to the automatic-answering control unit 56c an outgoing-subaddress number $W_1$ and an incoming-subaddress number $Y_1$, and further sends back to the network the callsetting acceptance message (5d) and the ringing message (5e).

If the automatic answering function is not set at the present telephone set of FIG. 26, then the communication protocol controller 56a sends no data to the automatic-answering controller 56c, and gives a drive instruction to the ringing controller 56f to cause the sounder 57 to ring through the ringing signal generator 64.

The automatic-answering controller 56c then collates or compares the incoming-subaddress $Y_1$ received from the incoming signal with the called-individual incoming subaddresses previously entered through the key input unit 60 (step 263). The incoming subaddress of the incoming signal may be registered together with an outgoing subaddress (to be explained later) and also may be erased as necessary. As a result of the collation at step 263, if the controller 56 finds an incoming-subaddress coincidence (step 264), then the communication protocol controller 56a is activated to return the answering message (5g) therefrom to the network. In response, when the automatic answering unit 61 receives the answering confirmation message (5j) from the network, the communication protocol controller 56a issues an automatic-answering response instruction to the speech controller 56b. The switches 65 and 68 are driven to connect the automatic answering unit 61 to the codec 53. Further, the communication protocol controller unit 56a also issues an instruction indicative of the issuance of the automatic-answering response message to the automatic answering controller 56c to cause the automatic answering unit 61 to send the automatic-answering response message to the caller (step 265).

When it is desired for the user of the caller telephone set to give a message to the party to be called (step 266), the caller may give a suitable operation through the caller telephone set or, after having listened at the caller for telephone a beep tone, she or he may record her or his message.

Next, when the party to be called has a message to tell a specific caller (step 268), the automatic answering control means 56c collates the outgoing subaddress $W_1$ of the incoming signal received in the incoming signal reception mode with the outgoing subaddresses previously registered (step 260), because the outgoing subaddress of the above-mentioned caller is previously registered through the key input unit 60 and the automatic answering function is set at the telephone set. As a result of the collation, if the automatic answering controller 56c finds a coincidence in outgoing subaddresses (step 270), the control proceeds to step 271 where the recorded message is transmitted to the caller as in step 265.

When it is desired to send to a particular caller a previously recorded receiver's message for the received incoming call, the already recorded message is replaced by the message of step 268, whereby the above demand can be realized by using a similar flowchart in which steps 268 to 271 are exactly the same as those in the above flowchart.

With such an arrangement as mentioned in the foregoing, the automatic answering unit can answer only to the particular incoming calls. As a result, a quantity of message to be recorded can be reduced and thus the capacity of the memory of the automatic answering unit can be decreased.

What is claimed is:

1. A communication terminal apparatus adapted for use by a plurality of parties and connected to a digital network capable of transmitting call setting data to a called party, said apparatus comprising:

detection means for detecting calling party identification data and called party identification data both contained in said call setting data, wherein said calling party identification data includes data specifying a calling terminal;

registration means for storing a plurality of calling party identification data and a plurality of called party identification data;

comparison means for comparing said calling party identification data and said called party identification data detected by said detection means with said plurality of calling party identification data and said plurality of called party identification data stored in said registration means; and notification means for informing said called party of said calling party and said called party corresponding to said calling party identification data and said called party identification data based on the result of the comparison made by said comparison means.

2. A communication terminal apparatus as set forth in claim 1, wherein said detection means detects subaddress data contained in said call setting data as said called party identification data.

3. A communication terminal apparatus as set forth in claim 1, wherein said called party identification data contains data specifying a called party among said plurality of parties using said communication terminal apparatus.

4. A communication terminal apparatus as set forth in claim 1, wherein said registration means includes a table containing auxiliary data corresponding to said called parties associated with data specifying said called parties.

5. A communication terminal apparatus as set forth in claim 1, wherein said called party identification data contains data specifying a called terminal.

6. A communication terminal apparatus as set forth in claim 1, wherein said notification means includes display means for displaying a character representation of said called party.

7. A communication terminal apparatus as set forth in claim 1, wherein said notification means includes display means for displaying a representation of a called terminal.

8. A communication terminal apparatus as set forth in claim 1, wherein said notification means generates a ringing signal comprising a plurality of differing tones corresponding to said called party identification data.

9. A communication terminal apparatus as set forth in claim 1, wherein said notification means generates a plurality of different tones corresponding to data specifying respective called parties contained in said called party identification data.

10. A communication terminal apparatus as set forth in claim 1, wherein said notification means generates a plurality of different musical tones corresponding to data specifying respective called parties contained in said called party identification data.

11. A communication terminal apparatus as set forth in claim 1, wherein said notification means includes ringing-signal generator means for generating a plurality of ringing signals and means for instructing the ringing-signal generator means to generate one of said plurality of ringing signals corresponding to data specifying a called party contained in said called party identification data.

12. A method of controlling a communication terminal apparatus adapted for use with a plurality of parties and connected to a digital network capable of transmitting call setting data to a called party, said method comprising the steps of:

registering a plurality of calling party identification data and a plurality of called party identification data;

detecting calling party identification data and called party identification data both contained in said call setting data;

comparing said calling party identification data and said called party identification data detected in said detecting step with said calling party identification data and said called party identification data registered in said registering step;

accepting an incoming signal upon favorable comparison in said comparing step of the identification data detected in said detecting step with the identification data registered in said registering step; and informing said called party of said calling party and said called party corresponding to said calling party identification data and said called party identification data upon a favorable comparison in said comparing step.

* * * * *

UNITED STATES PATENT AND TRADEMARK OFFICE
CERTIFICATE OF CORRECTION

PATENT NO. : 5,220,599
DATED : June 15, 1993
INVENTOR(S) : Jun Sasano et al.

It is certified that error appears in the above-indentified patent and that said Letters Patent is hereby corrected as shown below:

Abstract, Title Page, line 15, before "corresponding" reinsert --data--.

Abstract, Title Page, line 17, before "then" insert --,-- and change "acception" to --acceptance--.

Abstract, Title Page, line 19, before "then" insert --,-- and change "acception" to --acceptance--.

Signed and Sealed this

Seventeenth Day of May, 1994

Attest:

BRUCE LEHMAN

Attesting Officer

Commissioner of Patents and Trademarks